United States Patent
Song et al.

(10) Patent No.: US 12,448,468 B2
(45) Date of Patent: Oct. 21, 2025

(54) CATALYST FOR OLEFIN POLYMERIZATION AND POLYMERIZATION METHOD USING SAME

(71) Applicants: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

(72) Inventors: Wenbo Song, Beijing (CN); Shuliang Han, Beijing (CN); Zhao Jin, Beijing (CN); Lusheng Wang, Beijing (CN); Haokun Li, Beijing (CN); Yuanyuan Fang, Beijing (CN)

(73) Assignees: CHINA PETROLEUM & CHEMICAL CORPORATION, Beijing (CN); BEJING RESEARCH INSTITUTE OF CHEMICAL INDUSTRY, CHINA PETROLEUM & CHEMICAL CORPORATION, Beijing (CN)

( * ) Notice: Subject to any disclaimer, the term of this patent is extended or adjusted under 35 U.S.C. 154(b) by 573 days.

(21) Appl. No.: 17/772,258

(22) PCT Filed: Oct. 28, 2020

(86) PCT No.: PCT/CN2020/124337
§ 371 (c)(1),
(2) Date: Apr. 27, 2022

(87) PCT Pub. No.: WO2021/083194
PCT Pub. Date: May 6, 2021

(65) Prior Publication Data
US 2022/0372177 A1 Nov. 24, 2022

(30) Foreign Application Priority Data

Oct. 28, 2019 (CN) .......................... 201911032074.2
Oct. 28, 2019 (CN) .......................... 201911032096.9
Oct. 28, 2019 (CN) .......................... 201911032105.4
Oct. 28, 2019 (CN) .......................... 201911033274.X
Oct. 28, 2019 (CN) .......................... 201911033277.3

(51) Int. Cl.
*C08F 4/64* (2006.01)
*C07F 17/00* (2006.01)
(Continued)

(52) U.S. Cl.
CPC .......... *C08F 4/64079* (2013.01); *C07F 17/00* (2013.01); *C08F 4/6428* (2013.01); *C08F 10/02* (2013.01); *C08F 2420/07* (2021.01)

(58) Field of Classification Search
CPC .............................. C08F 4/6592; C08F 10/00
See application file for complete search history.

(56) References Cited

U.S. PATENT DOCUMENTS 6,706,827 B1  3/2004  Lyu et al.
2004/0143077 A1  7/2004  Lyu et al.
(Continued)

FOREIGN PATENT DOCUMENTS

CN  1955200 A  5/2007
CN  101092459 A  12/2007
(Continued)

OTHER PUBLICATIONS

Kotohiro Nomura et al., Olefin Polymerization by (Cyclopentadienyl)(aryloxy)titanium(IV) Complexes—Cocatalyst Systems, *Macromolecules*, vol. 31, Issue 22, pp. 7588-7597, (1998).
(Continued)

*Primary Examiner* — Catherine S Branch
(74) *Attorney, Agent, or Firm* — FINNEGAN, HENDERSON, FARABOW, GARRETT & DUNNER LLP

(57) ABSTRACT

Disclosed is a catalyst for olefin polymerization, comprising a main catalyst and a cocatalyst; the main catalyst is a bisphenol metal complex represented by formula I, and the cocatalyst comprises an organoaluminum compound; in formula I, $R_1$, $R_1'$, $R_2$, $R_2'$ are the same or different, and are each independently selected from hydrogen and a substituted or unsubstituted $C_1$-$C_{20}$ hydrocarbyl; $R_3$-$R_7$, $R_3'$-$R_7'$ are the same or different, and are each independently selected from hydrogen and a substituted or unsubstituted $C_1$-$C_{20}$ hydrocarbyl; $R_8$ and $R_9$ are the same or different, and are each independently selected from hydrogen or a substituted or unsubstituted $C_1$-$C_{20}$ hydrocarbyl; M and M' are the same or different, and are selected from Group IV metals; and X is halogen;

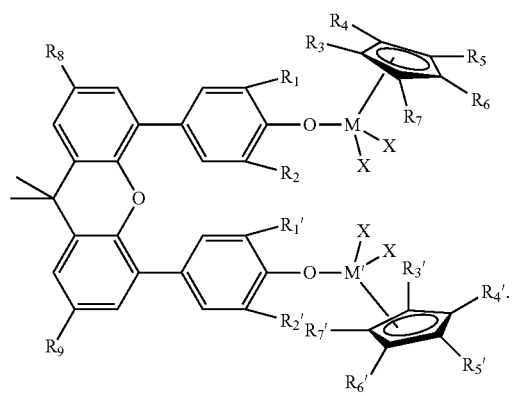

Formula I

16 Claims, No Drawings

(51) Int. Cl.
*C08F 4/642* (2006.01)
*C08F 10/02* (2006.01)
*C08F 110/02* (2006.01)

(56) References Cited

U.S. PATENT DOCUMENTS

| | | |
|---|---|---|
| 2008/0200708 A1 | 8/2008 | Damrau et al. |
| 2016/0130372 A1 | 5/2016 | Do et al. |
| 2022/0372177 A1 | 11/2022 | Song et al. |

FOREIGN PATENT DOCUMENTS

| | | |
|---|---|---|
| CN | 101798361 A | 8/2010 |
| CN | 101864010 A | 10/2010 |
| CN | 101864040 A | 10/2010 |
| CN | 102268032 A | 12/2011 |
| CN | 104693327 A | 6/2015 |
| CN | 104725533 A | 6/2015 |
| CN | 108191907 A | 6/2018 |
| CN | 110386955 A | 10/2019 |
| CN | 110386957 A | 10/2019 |
| EP | 0964004 A1 | 12/1999 |
| JP | 2000007724 A | 1/2000 |
| JP | 2004231846 A | 8/2004 |
| JP | 2006509868 A | 3/2006 |
| JP | 2007119435 A | 5/2007 |
| JP | 2008542516 A | 11/2008 |
| RU | 2317306 C2 | 2/2008 |
| RU | 2670752 C2 | 10/2018 |
| WO | WO 2004052980 A1 | 6/2004 |
| WO | WO 2013064235 A1 | 5/2013 |
| WO | WO 2019070889 A1 | 4/2019 |

OTHER PUBLICATIONS

Hongbo Li et al., Nuclearity and cooperativity effects in binuclear catalysts and cocatalysts for olefin polymerization, *Proceedings of the National Academy of Sciences*, vol. 103 Issue 42, pp. 15295-15302, (2006).

International Search Report and Written Opinion of International Application No. PCT/CN2020/124337, mailed Jan. 4, 2021.

M. McNevin et al., Dititanium Complexes of Preorganized Binucleating Bis(amidinates), *Inorganic Chemistry*, 43(26), pp. 8547-8554 (2004).

L. Zhang et al., A novel tridentate [ONS] binuclear titanium complex bearing oxo-bridged macrocyclic structure for ethylene polymerization, *Journal of Organometallic Chemistry*, 856, pp. 50-55 (2018).

T. Wang et al., Synthesis of Oxygen-bridged Binuclear Titanium and Nickel Complexes and Application in Catalysis of Bimodal Polyethylene, *Chemical Journal of Chinese University*, vol. 39, No. 11, pp. 2586-2593 (2018).

Extended European Search Report in counterpart European Patent Application No. EP20881486.3 dated Oct. 30, 2023.

Extended European Search Report in counterpart European Patent Application No. EP20882922.6 dated Oct. 30, 2023.

Shuliang Han et al., Binuclear Heteroligated Titanium Catalyst Based on Phenoxyimine Ligands: Synthesis, Characterization, and Ethylene (Co)polymerization, *Macromolecules*, 45(10), pp. 4054-4059, 2012.

CATALYST FOR OLEFIN POLYMERIZATION AND POLYMERIZATION METHOD USING SAME

CROSS REFERENCE OF RELATED APPLICATIONS

This application is a national stage filing under 35 U.S.C. § 371 of International Application No. PCT/CN2020/124337, filed Oct. 28, 2020, which claims the priority to and benefits of Chinese Patent Application No. 201911032105.4, 201911033274.X, 201911032074.2, 201911032096.9 and 201911033277.3, filed Oct. 28, 2019, all of which are incorporated herein by reference.

TECHNICAL FIELD

The present invention relates to a catalyst for olefin polymerization and an olefin polymerization processes using the same.

BACKGROUND ART

The application of coordination polymerization catalysts represented by Ziegler-Natta catalysts has promoted the rapid development of the polyolefin industry. Nowadays, the development of metal catalysts for solution polymerization has become one of the research hotspots in the field of coordination polymerization, and phenol ligand-based transition metal catalysts belong to one class of them. This class of catalyst has good catalytic activity for olefin polymerization. For example, a 2,6-diisopropyl phenoxy titanium catalyst has successfully realized the homopolymerization of ethylene to afford linear polyethylene (Nomura K, Naga N, Miki M, et al., *Macromolecules* 1998, 31, 7588-7597), and when used in the copolymerization of ethylene and an α-olefin, a copolymer with high α-olefin content can be obtained, which can be a thermoplastic elastomer.

At the same time, based on the research results of active enzyme catalysis, synergistic catalysts have been gradually developed. Researches have revealed that when double zirconium metal catalysts are used, the ethylene polymerization activity and the molecular weight of the resulting polymer are comparative to those obtained when single zirconium metal catalysts are used, but an ethyl grafting rate in the polymer chain is much higher, reaching 12%, while the ethyl grafting rate in the polymer obtained by using the single zirconium metal catalysts to catalyze ethylene polymerization is only 1.1%. At the same time, when the double zirconium metal catalysts are used, the ethyl grafting rate (12%) in the polymer obtained by using a double boron cocatalyst is also higher than the ethyl grafting rate (2.7%) in the polymer obtained by using a single boron cocatalyst (Li, H.; Marks, T. J. *Proc. Natl. Acad. Sci.* 2006, 103, 15295).

CN201010204671.1 discloses the homopolymerization of ethylene and the copolymerization of ethylene with monomers such as hexene and octene using a double titanium metal catalyst. The polymerization activity under normal pressure is on the order of $10^4$ g·mol$^{-1}$(Ti)·$^{-1}$, the molecular weight of the copolymer is about 300,000, and the molecular weight distribution is greater than 2.

There is still a need in the art to develop novel metal compounds exhibiting desired catalytic performance and olefin polymerization processes using such novel catalysts.

SUMMARY OF THE INVENTION

The inventors have conducted diligent researches and, as a result, found that when used in olefin polymerization, a class of bisphenol metal complexes exhibit high catalytic efficiency and high comonomer incorporation ability. On this basis, the present invention has been made.

Thus, an object of the present invention is a catalyst for olefin polymerization, which comprises a bisphenol metal complex-based main catalyst and a cocatalyst.

Another object of the present invention is to provide a process for homopolymerizing an olefin such as ethylene, which uses a catalyst comprising a bisphenol metal complex-based main catalyst and a cocatalyst. The molecular weight of the polyethylene prepared by this process can be up to 200,000 or more, and the polydispersity ranges from 1.5 to 20.

Another object of the present invention is to provide a process for copolymerizing olefins such as ethylene, which uses a catalyst comprising a bisphenol metal complex-based main catalyst and a cocatalyst. The weight average molecular weight of the polyethylene prepared by this process can be up to 200,000 or more, the molecular weight distribution ranges from 1.5 to 10, and the content of the comonomer can be 1-30 mol %.

DETAILED DESCRIPTION OF PREFERRED EMBODIMENTS

Various specific embodiments, versions of the present invention will now be described, including preferred embodiments and definitions that are adopted herein. While the following detailed description gives specific preferred embodiments, those skilled in the art will appreciate that these embodiments are exemplary only, and that the present invention can be practiced in other ways. Any reference to the "invention" may refer to one or more, but not necessarily all, of the present inventions defined by the claims. The use of headings is for purposes of convenience only and does not limit the scope of the present invention.

For the purposes of this invention and the claims thereto, the new numbering scheme for the Periodic Table Groups is used as described in Chemical and Engineering News, 63(5), pg. 27 (1985).

As used herein, the term "substituting" or "substituted" means that one or more hydrogen atoms on the group in question is replaced with a C1-C6 alkyl, phenyl, benzyl, a halogen atom, a heteroatom, a heteroatom-containing group such as C1-C6 alkoxy, or a carbon atom in main chain is replaced by a heteroatom. Examples of substituents include, but are not limited to, methyl, ethyl, propyl, isopropyl, butyl, isobutyl, pentyl, isopentyl, hexyl, cyclopentyl, cyclohexyl, phenyl, benzyl, fluorine, chlorine, bromine, iodine, methoxy, and ethoxy.

As used herein, the term "halogen" or "halogen atom" refers to at least one of fluorine, chlorine, bromine, and iodine.

As used herein, the term "heteroatom" refers to at least one of O, S, N, P, B, Si, Ge and Sn.

As used herein, the term "organoaluminum compound" has meanings generally accepted in the art, that is, referring to a compound having an organic group-Al bond. Examples of organoaluminum compounds include aluminum alkyls, alkyl aluminum halides, modified or unmodified aluminoxanes.

As used herein, the term "polymerization" encompasses homopolymerization and copolymerization. As used herein, the term "polymer" encompasses homopolymers, copolymers and terpolymers.

As used herein, the term "catalyst component" refers to main catalyst component or procatalyst, which, together with a conventional cocatalyst such as an alkyl aluminum and an optional external electron donor, constitutes a catalyst for olefin polymerization (such a combination is also referred to as catalyst system in the art).

In a first aspect, the present invention provides a catalyst system for olefin polymerization, comprising a main catalyst and a cocatalyst.

Catalyst Compounds

In this disclosure, the bisphenol metal complex represented by Formula I is used as the catalyst compound:

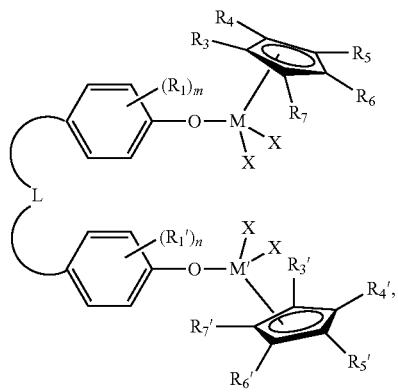

Formula I wherein $R_1$ and $R_1'$ are each independently selected from the group consisting of hydrogen and substituted or unsubstituted $C_1$-$C_{20}$ hydrocarbyl; $R_3$-$R_7$, $R_3'$-$R_7'$ are each independently selected from the group consisting of hydrogen and substituted or unsubstituted $C_1$-$C_{20}$ hydrocarbyl, and any two adjacent groups of $R_3$-$R_7$ are optionally joined to form a ring, and any two adjacent groups of $R_3'$-$R_7'$ are optionally joined to form a ring; M and M' are each independently a Group 4 metal; each X is independently selected from the group consisting of hydrocarbyl having 1 to 20 carbon atoms, hydride, amido, alkoxide, alkyl sulfide, alkyl phophide, halide, diene, amine, phosphine, ether, and combinations thereof; m and n are independently an integer of from 1 to 4; and L is a divalent linking group.

In some embodiments, the divalent linking group L is a divalent hydrocarbyl or a divalent linking group in substantial hydrocarbon nature, having 1-30 carbon atoms. As used herein, the term "divalent linking group in substantial hydrocarbon nature" refers to a divalent group exhibiting hydrocarbon properties as a whole. Such a group allows one or more heteroatoms to be included in the hydrocarbon chain, but does not have an active hydrogen. The divalent linking group L useful in the present invention can be selected from the group consisting of C1-C30 alkylene, C1-C30 heteroalkylene, C5-C30 cycloalkylene, C4-C30 heterocycloalkylene, C2-C30 alkenylene, C2-C30 heteroalkenylene, C4-C30 cycloalkenylene, C4-C30 heterocycloalkenylene, C2-C30 alkynylene, C2-C30 heteroalkynylene, C6-C30 arylene, and C4-C30 heteroarylene. Examples of L include, but are not limited to, methylene, 1,2-ethylene, 1,3-propylene, 1,2-cyclopentandiyl, 1,3-cyclopentandiyl, 1,2-cyclohexandiyl, 1,3-cyclohexandiyl, 1,4-cyclohexandiyl, 1,2-phenylene, 1,3-phenylene, 1,4-phenylene, 1,8-naphthylene, 1,8-anthrylene, 1,8-fluorenylene, 1,8-carbazolylidene, 4,5-acridinediyl, 4H-dibenzopyran-1,9-diyl, and corresponding groups which have one or more alkyl substituents such as C1-C6 alkyl substituents on the carbon chain and/or ring of the above-mentioned groups.

In some preferred embodiments, the bisphenol metal complex of the present disclosure has a structure represented by Formula Ia:

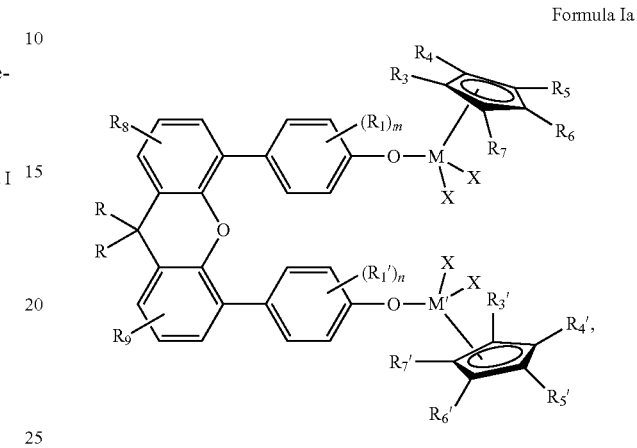

Formula Ia wherein, $R_1$ and $R_1'$ are each independently selected from the group consisting of hydrogen and substituted or unsubstituted $C_1$-$C_{20}$ hydrocarbyl; $R_3$-$R_7$, $R_3'$-$R_7'$ are each independently selected from the group consisting of hydrogen and substituted or unsubstituted $C_1$-$C_{20}$ hydrocarbyl, and any two adjacent groups of $R_3$-$R_7$ are optionally joined to form a ring, and any two adjacent groups of $R_3'$-$R_7'$ are optionally joined to form a ring; $R_8$ and $R_9$ are each independently selected from the group consisting of hydrogen and substituted or unsubstituted $C_1$-$C_{20}$ hydrocarbyl; each R is independently selected from the group consisting of hydrogen and substituted or unsubstituted $C_1$-$C_{20}$ hydrocarbyl; M and M' are each independently a Group 4 metal; each X is independently selected from the group consisting of hydrocarbyl having 1 to 20 carbon atoms, hydride, amido, alkoxide, alkyl sulfide, alkyl phophide, halide, diene, amine, phosphine, ether, and combinations thereof; and m and n are independently an integer of from 1 to 4.

In some preferred embodiments, the bisphenol metal complex of the present disclosure has a structure represented by Formula Ib:

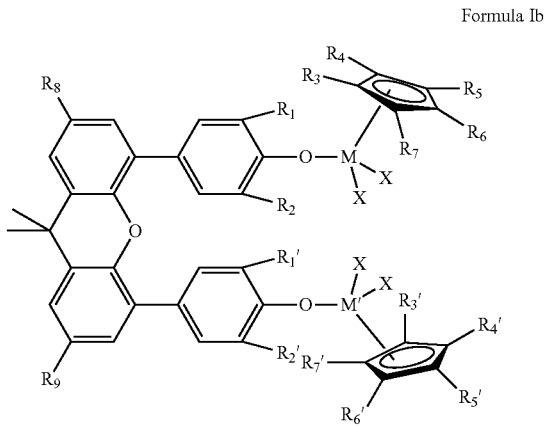

Formula Ib wherein, $R_1$, $R_1'$, $R_2$, $R_2'$ are each independently selected from the group consisting of hydrogen and substituted or unsubstituted $C_1$-$C_{20}$ hydrocarbyl; $R_3$-$R_7$, $R_3'$-$R_7'$ are each independently selected from the group consisting of hydrogen and substituted or unsubstituted $C_1$-$C_{20}$ hydrocarbyl, and any two adjacent groups of $R_3$-$R_7$ are optionally joined to form a ring, and any two adjacent groups of $R_3'$-$R_7'$ are optionally joined to form a ring; $R_8$ and $R_9$ are each independently selected from the group consisting of hydrogen and substituted or unsubstituted $C_1$-$C_{20}$ hydrocarbyl; M and M' are each independently a Group 4 metal; each X is independently selected from the group consisting of hydrocarbyl having 1 to 20 carbon atoms, hydride, amido, alkoxide, alkyl sulfide, alkyl phophide, halide, diene, amine, phosphine, ether, and combinations thereof.

In some preferred embodiments, in Formulae I, Ia and Ib, $R_1$, $R_1'$, $R_2$, $R_2'$, are each independently selected from the group consisting of hydrogen, substituted or unsubstituted, linear or branched $C_1$-$C_{20}$ alkyl and substituted or unsubstituted $C_6$-$C_{20}$ aryl, preferably from the group consisting of hydrogen and substituted or unsubstituted, linear or branched $C_1$-$C_{10}$ alkyl, and more preferably from the group consisting of hydrogen and substituted or unsubstituted, linear or branched $C_1$-$C_6$ alkyl.

In some preferred embodiments, in Formulae I, Ia and Ib, $R_3$-$R_7$, $R_3'$-$R_7'$ are each independently selected from the group consisting of hydrogen and substituted or unsubstituted, linear or branched $C_1$-$C_{20}$ alkyl, preferably from the group consisting of hydrogen and substituted or unsubstituted, linear or branched $C_1$-$C_{10}$ alkyl, and more preferably from the group consisting of hydrogen and substituted or unsubstituted, linear or branched $C_1$-$C_6$ alkyl.

In some preferred embodiments, in Formulae Ia and Ib, $R_8$ and $R_9$ are each independently selected from the group consisting of hydrogen and substituted or unsubstituted, linear or branched $C_1$-$C_{20}$ alkyl, preferably from the group consisting of hydrogen and substituted or unsubstituted, linear or branched $C_1$-$C_{10}$ alkyl, and more preferably from the group consisting of hydrogen and substituted or unsubstituted, linear or branched $C_1$-$C_6$ alkyl.

In some preferred embodiments, in Formulae I, Ia and Ib, M and M' are each independently selected from the group consisting of titanium, zirconium and hafnium, preferably is titanium.

In some preferred embodiments, in Formulae I, Ia and Ib, each X is independently selected from the group consisting of methyl, fluoride, chloride, bromide and iodide, and preferably is methyl or chloride.

In some embodiments, the bisphenol metal complex is at least one of the following complexes represented by Formula Ib:

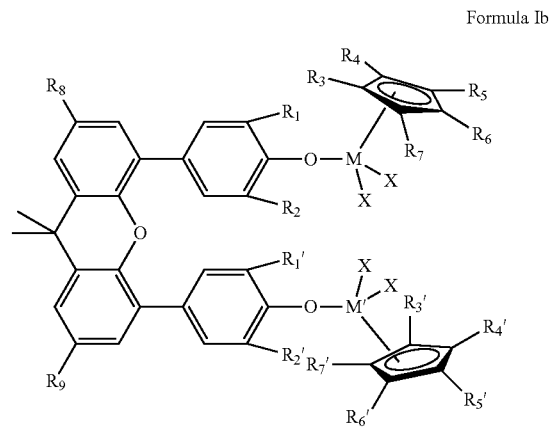

Formula Ib bisphenol metal complex 1: $R_1=R_2=R_1'=R_2'=$Me, $R_3=R_4=R_5=R_6=R_7=R_3'=R_4'=R_5'=R_6'=R_7'=R_8=R_9=$H, M=M'=Ti, X=Cl;

bisphenol metal complex 2: $R_1=R_2=R_1'=R_2'=$Et, $R_3=R_4=R_5=R_6=R_7=R_3'=R_4'=R_5'=R_6'=R_7'=R_8=R_9=$H, M=M'=Ti, X=Cl;

bisphenol metal complex 3: $R_1=R_2=R_1'=R_2'=$iPr, $R_3=R_4=R_5=R_6=R_7=R_3'=R_4'=R_5'=R_6'=R_7'=R_8=R_9=$H, M=M'=Ti, X=Cl;

bisphenol metal complex 4: $R_1=R_2=R_1'=R_2'=$tBu, $R_3=R_4=R_5=R_6=R_7=R_3'=R_4'=R_5'=R_6'=R_7'=R_8=R_9=$H, M=M'=Ti, X=Cl;

bisphenol metal complex 5: $R_1=R_2=R_1'=R_2'=$Me, $R_3=R_4=R_5=R_6=R_7=R_3'=R_4'=R_5'=R_6'=R_7'=R_8=R_9=$H, M=M'=Ti, X=Cl;

bisphenol metal complex 6: $R_1=R_2=R_1'=R_2'=$Et, $R_3=R_4=R_5=R_6=R_7=R_3'=R_4'=R_5'=R_6'=R_7'=$Me, $R_8=R_9=$H, M=M'=Ti, X=Cl, bisphenol metal complex 7: $R_1=R_2=R_1'=R_2'=$iPr, $R_3=R_4=R_5=R_6=R_7=R_3'=R_4'=R_5'=R_6'=R_7'=$Me, $R_8=R_9=$H, M=M'=Ti, X=Cl, bisphenol metal complex 8: $R_1=R_2=R_1'=R_2'=$tBu, $R_3=R_4=R_5=R_6=R_7=R_3'=R_4'=R_5'=R_6'=R_7'=$Me, $R_8=R_9=$H, M=M'=Ti, X=Cl, and corresponding compounds where X=methyl.

The above-described bisphenol metal complexes can be prepared by a method known per se. In some embodiments, the bisphenol metal complex may be prepared by a method comprising the steps of:

1) reacting a corresponding bisphenol compound with a strong base to form a bisphenol di-salt; and 2) reacting the bisphenol di-salt with a metal complex represented by Formula V to obtain the bisphenol metal complex represented by Formula I,

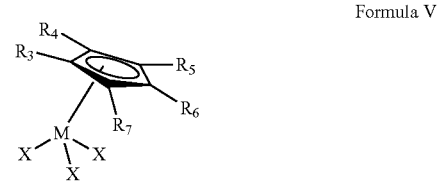

Formula V wherein, $R_3$-$R_7$, M and X have the same meanings as defined above for Formula I.

In some specific embodiments, the bisphenol metal complex represented by Formula Ib may be prepared by a method comprising the steps of:

1) reacting a bisphenol compound represented by Formula II with a metal compound represented by Formula III to obtain a bisphenol di-salt represented by Formula IV; and 2) reacting the bisphenol di-salt compound represented by Formula IV with a metal complex represented by Formula V to obtain the bisphenol metal complex represented by Formula Ib;

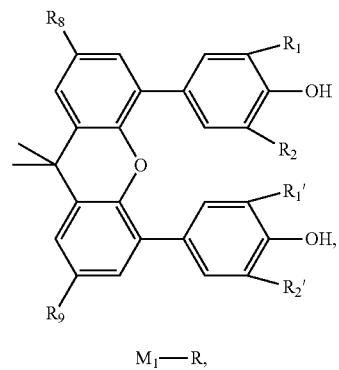

Formula II

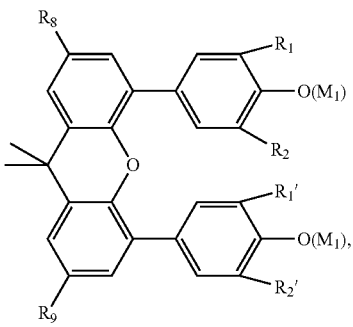

Formula IV

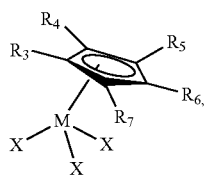

Formula III $M_1$—R,

Formula V wherein, in Formulae II and IV, $R_1$, $R_1'$, $R_2'$, $R_2'$, $R_8$ and $R_9$ have the same meanings as defined above for Formula Ib; in Formula III, $M_1$ is a Group IA metal, preferably lithium, sodium or potassium, and R is hydrogen or a linear or branched $C_1$-$C_{10}$ alkyl; and in Formula V, $R_3$-$R_7$, M and X have the same meanings as defined above for Formula Ib.

In some preferred embodiments of the invention, the preparation method comprises: reacting the bisphenol compound represented by Formula II with the metal compound represented by Formula III in an organic solvent to obtain the bisphenol di-salt compound represented by Formula IV; then, reacting the bisphenol di-salt compound with the metal complex represented by Formula V in an organic solvent to obtain the bisphenol metal complex represented by Formula Ib. According to some embodiments of the invention, the organic solvent is selected from tetrahydrofuran, diethyl ether, 1,4-dioxane, and dichloromethane.

In some preferred embodiments of the invention, the bisphenol compound is at least one of the following bisphenol compounds represented by Formula II:

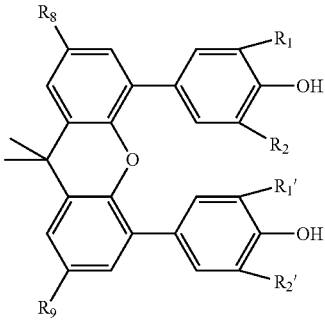

Formula II bisphenol compound 1: $R_1$=$R_2$=$R_1'$=$R_2'$=Me, $R_8$=$R_9$=H;
bisphenol compound 2: $R_1$=$R_2$=$R_1'$=$R_2'$=Et, $R_8$=$R_9$=H;
bisphenol compound 3: $R_1$=$R_2$=$R_1'$=$R_2'$=iPr, $R_8$=$R_9$=H;
bisphenol compound 4: $R_1$=$R_2$=$R_1'$=$R_2'$=tBu, $R_8$=$R_9$=H.

In some preferred embodiments of the invention, the metal compound represented by Formula III is at least one selected from KH, NaH, MeLi, EtLi, PrLi and BuLi.

In some preferred embodiments of the invention, the compound represented by Formula IV is at least one of the following compounds:

Formula IV phenoxide compound 1: $R_1$=$R_2$=$R_1'$=$R_2'$=Me, $R_8$=$R_9$=H; $M_1$=Li;
phenoxide compound 2: $R_1$=$R_2$=$R_1'$=$R_2'$=Et, $R_8$=$R_9$=H; $M_1$=Li;
phenoxide compound 3: $R_1$=$R_2$=$R_1'$=$R_2'$=iPr, $R_8$=$R_9$=H; $M_1$=Li;
phenoxide compound 4: $R_1$=$R_2$=$R_1'$=$R_2'$=tBu, $R_8$=$R_9$=H; $M_1$=Li;
phenoxide compound 5: $R_1$=$R_2$=$R_1'$=$R_2'$=Me, $R_8$=$R_9$=H; $M_1$=Na;
phenoxide compound 6: $R_1$=$R_2$=$R_1'$=$R_2'$=Et, $R_8$=$R_9$=H; $M_1$=Na;
phenoxide compound 7: $R_1$=$R_2$=$R_1'$=$R_2'$=iPr, $R_8$=$R_9$=H; $M_1$=Na;
phenoxide compound 8: $R_1$=$R_2$=$R_1'$=$R_2'$=tBu, $R_8$=$R_9$=H; $M_1$=Na;
phenoxide compound 9: $R_1$=$R_2$=$R_1'$=$R_2'$=Me, $R_8$=$R_9$=H; $M_1$=K;
phenoxide compound 10: $R_1$=$R_2$=$R_1'$=$R_2'$=Et, $R_8$=$R_9$=H; $M_1$=K;

phenoxide compound 11: $R_1=R_2=R_1'=R_2'=iPr$, $R_8=R_9=H$; $M_1=K$;

phenoxide compound 12: $R_1=R_2=R_1'=R_2'=tBu$, $R_8=R_9=H$; $M_1=K$;

In some preferred embodiments of the invention, the metal compound represented by Formula V is at least one of the following metal complexes:

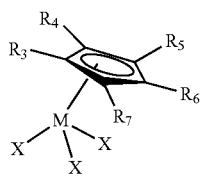

Formula V metal complex 1: $R_3=R_4=R_5=R_6=R_7=H$, $M=Ti$, $X=Cl$;

metal complex 2: $R_3=R_4=R_5=R_6=R_7=Me$, $M=Ti$, $X=Cl$.

In some preferred embodiments of the inventive method, a molar ratio of the bisphenol compound represented by Formula II to the compound represented by Formula III is 1: (1-20), for example, 1:2.5, 1:3, 1:3.5, 1:4, 1:4.5, 1:5, 1:5.5, 1:6, 1:6.5, 1:7, 1:7.5, 1:8, 1:8.5, 1:9, 1:9.5, 1:10, 1:10.5, 1:11, 1:11.5, 1:12, 1:12.5, 1:13, 1:13.5, 1:14, 1:14.5, 1:15, 1:15.5, 1:16, 1:16.5, 1:17, 1:17.5, 1:18, 1:18.5, 1:19, 1:19.5, 1:20 and any value therebetween, preferably 1: (2-10), and more preferably 1: (4-8).

In some preferred embodiments of the inventive method, a reaction temperature for the reaction between the bisphenol compound represented by Formula II and the compound represented by Formula III is from −78° C. to 60° C., for example, −60° C., −50° C., −40° C., −30° C., −20° C., −10° C., 0° C., 10° C., 20° C., 30° C., and any value therebetween, and preferably from −10° C. to 40° C.

In some preferred embodiments of the inventive method, a reaction time for the reaction between the bisphenol compound represented by Formula II and the compound represented by Formula III is from 1 to 10 hours, for example, 1.5, 2, 2.5, 3, 3.5, 4, 4.5, 5, 5.5, 6, 6.5, 7, 7.5, 8, 8.5, 9, 9.5 hours and any value therebetween, and preferably from 1.5 to 3 hours.

In some preferred embodiments of the inventive method, a molar ratio of the compound represented by Formula IV to the metal compound represented by Formula V is 1: (1.8-2.4), for example, 1:1.9, 1:2, 1:2.1, 1:2.2, 1:2.3, 1:2.4, and any value therebetween, and preferably 1:2. Simply, the number of moles of the bisphenol compound can be regarded as the number of moles of the compound represented by Formula IV.

In some preferred embodiments of the inventive method, a reaction temperature for the reaction between the compound represented by Formula IV and the metal compound represented by Formula V is from −78° C. to 60° C., for example, −60° C., −50° C., −40° C., −30° C., −20° C., −10° C., 0° C., 10° C., 20° C., 30° C., and any value therebetween, and preferably from −10° C. to 40° C.

In some preferred embodiments of the inventive method, a reaction time for the reaction between the compound represented by Formula IV and the metal compound represented by Formula V is from 6 to 24 hours, for example, 6, 7, 8, 9, 10, 11, 12, 13, 14, 15, 16, 17, 18, 19, 20, 21, 22, 23, 24 hours and any value therebetween, and preferably from 6 to 19 hours.

Main Catalyst of the Catalyst System

In some embodiments of the invention, for example, where the catalyst system is to be used in solution polymerization, the catalyst compound itself is used as the main catalyst component.

In some other embodiments of the invention, for example, where the catalyst system is to be used in slurry polymerization or gas phase polymerization, the main catalyst component comprises the catalyst compound, for example, the main catalyst component comprises a combination of the catalyst compound and a support material.

Activators

In this disclosure, the terms "activator" and "cocatalyst" are generally used interchangeably. According to the present invention, the catalyst compound can be combined with the activator in any manner known in the art, including, for example, directly combining the catalyst compound with the activator for use in solution polymerization, and supporting the catalyst compound and then combining the supported catalyst compound with the activator for use in slurry or gas phase polymerization. The activator is generally any compound which can activate any one of the catalyst compounds described above by converting the neutral metal compound to a catalytically active metal compound cation. Examples of the activator includes organoaluminum compounds such as aluminoxanes and aluminum alkyls, ionizing activators, which may be neutral or ionic, and conventional-type cocatalysts such as alkyl aluminum halides. Preferred activators typically include aluminum alkyls, alkyl aluminum halides, aluminoxane compounds, modified aluminoxane compounds, and ionizing anion precursor compounds that abstract one reactive, 6-bound, metal ligand making the metal compound cationic and providing a charge-balancing noncoordinating or weakly coordinating anion.

Aluminoxane Activators

Aluminoxane activators may be utilized as an activator for the catalyst compound described herein. Aluminoxanes are generally oligomeric compounds containing —Al($R^1$)—O— sub-units, where $R^1$ is an alkyl group, for example, a $C_1$-$C_{12}$ alkyl group, more preferably a $C_1$-$C_6$ alkyl group, especially a $C_1$-$C_4$ alkyl group, for example, methyl or isobutyl. Examples of aluminoxanes include methylaluminoxane (MAO), modified methylaluminoxane (MMAO), ethylaluminoxane and isobutylaluminoxane. Alkylaluminoxanes and modified alkylaluminoxanes are suitable as activators for the catalyst compounds of the present invention, particularly when the abstractable ligand is an alkyl, a halide, an alkoxide or an amido. A useful aluminoxane is a modified methyl aluminoxane (MMAO) cocatalyst type 3A (commercially available from Akzo Chemicals, Inc. under the trade name Modified Methylaluminoxane type 3A).

When the activator is a modified or unmodified aluminoxane, some embodiments choose the maximum amount of activator of typically 5000- or 4500- or 4000- or 3000- or 2000-fold molar excess (Al/M) over the catalyst compound (per metal catalytic site). The minimum activator-to-catalyst-compound ratio is a 1:1, or 1:10, or 1:20, or 1:50, or 1:100, or 1:200 molar ratio. Alternate molar ratio ranges include from 1:1 to 500:1, alternately from 1:1 to 200:1, alternately from 1:1 to 100:1, or alternately from 1:1 to 50:1. A molar ratio range of the main catalyst to the cocatalyst (M/Al) may also be 1: (200-5000), for example, 1:500, 1:1000, 1:1500, 1:2000, 1:2500, 1:3000, 1:3500, 1:4000, 1:4500 and any value therebetween, and one preferred range is 1: (2000-3000).

In a class of embodiments, little or no aluminoxane is used in the polymerization processes described herein. For example, aluminoxane can be present at a molar ratio of aluminum to catalyst compound metal less than 100:1, or less than 300:1, or less than 500:1.

Ionizing/Non-Coordinating Anion Activators

The present disclosure also uses ionizing/non-coordinating anionic activators. The term "non-coordinating anion" (NCA) means an anion which either does not coordinate to a cation or which only weakly coordinates to a cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion.

Non-coordinating anions useful in accordance with the present disclosure are those that are compatible, stabilize the transition metal cation in the sense of balancing its ionic charge at +1, and yet retain sufficient lability to permit displacement during polymerization. In this disclosure, useful ionizing activators typically include an NCA, especially a compatible NCA.

It is within the scope of this invention to use an ionizing activator, neutral or ionic, such as tri(n-butyl)ammonium tetrakis(pentafluorophenyl)borate, a tris-perfluorophenyl boron metalloid precursor or a tris-perfluoronaphthyl boron metalloid precursor, polyhalogenated heteroborane anions, boric acid, or a combination thereof. Such an ionizing activator is also referred to as organoboron compound sometime. It is also within the scope of this invention to use neutral or ionic activators alone or in combination with aluminoxane or modified aluminoxane activators.

In this disclosure, these boron-containing ionizing/non-coordinating anionic activators are sometimes also referred to as organoboron compounds.

In some embodiments, the activator comprises one or more of the followings: trialkylammonium tetrakis(pentafluorophenyl)borates, N,N-dialkylanilinium tetrakis(pentafluorophenyl))borates, N,N-dimethyl-(2,4,6-trimethylanilinium) tetrakis(pentafluorophenyl)borate, trialkylammonium tetrakis(2,3,4,6-tetrafluorophenyl)borates, N,N-dialkylanilinium tetrakis(2,3,4,6-tetrafluorophenyl) borates, trialkylammonium tetrakis(perfluoronaphthyl)borates, N,N-dialkylanilinium tetrakis(perfluoronaphthyl)borates, trialkylammonium tetrakis(perfluorobiphenyl) borates, N,N-dialkylanilinium tetrakis(perfluorobiphenyl)borates, trialkylammonium tetrakis(3,5-bis(trifluoromethyl)phenyl)borates, N,N-dialkylanilinium tetrakis(3,5-bis(trifluoromethyl)phenyl)borates, N,N-dialkyl-(2,4,6-trimethylanilinium) tetrakis (3,5-bis(trifluoromethyl)phenyl)borates, bis(isopropyl)ammonium tetrakis(pentafluorophenyl)borate, where the alkyl group is methyl, ethyl, propyl, isopropyl, n-butyl, sec-butyl, isobutyl or tert-butyl.

In other embodiments, the activator comprises one or more triarylcarbonium borates, such as triphenylcarbonium tetraphenylborate, triphenylcarbonium tetrakis(pentafluorophenyl)borate, triphenylcarbonium tetrakis (2,3,4,6-tetrafluorophenyl)borate, triphenylcarbonium tetrakis(perfluoronaphthyl) borate, triphenylcarbonium tetrakis (perfluorobiphenyl)borate, triphenylcarbonium tetrakis(3,5-bis(trifluoromethyl)phenyl)borate).

Examples of preferred activators include N,N-dimethylanilinium tetrakis(perfluorophenyl)borate, N,N-dimethylanilinium tetrakis(perfluoronaphthyl) borate, N,N-dimethylanilinium tetrakis(perfluorobiphenyl)borate, N,N-dimethylanilinium tetrakis(3,5-bis(trifluoromethyl)phenyl) borate, triphenylcarbonium tetrakis(perfluorophenyl)borate, triphenylcarbenium tetrakis (perfluoronaphthyl)borate, triphenylcarbenium tetrakis(perfluorobiphenyl)borate, triphenylcarbonium tetrakis(3,5-bis(trifluoromethyl)phenyl)borate, trimethylammonium tetrakis(perfluorophenyl)borate, trimethylammonium tetrakis(perfluoronaphthyl)borate, trimethylammonium tetrakis(perfluorobiphenyl) borate, trimethylammonium tetrakis(3,5-bis(trifluoromethyl)phenyl)borate, triethylammonium tetrakis(perfluorophenyl)borate, triethylammonium tetrakis(perfluoronaphthyl)borate, triethylammonium tetrakis(perfluorobiphenyl) borate, triethylammonium tetrakis(3,5-bis(trifluoromethyl)phenyl)borate, tributylammonium tetrakis(perfluorophenyl)borate, tributylammonium tetrakis(perfluoronaphthyl)borate, tributylammonium tetrakis(perfluorobiphenyl) borate, tributylammonium tetrakis(3,5-bis(trifluoromethyl)phenyl) borate; 1-(4-(tris(pentafluorophenyl)borate)-2,3,5,6-tetrafluorophenyl)pyrrolidinium; and 4-(tris(pentafluorophenyl)borate)-2,3,5,6-tetrafluoropyridine.

The typical non-coordinating anionic activator to catalyst ratio, for example, the ratio of all NCA activators to catalyst (in terms of metal) is about 1:1 molar ratio. Alternative preferred ranges include 0.5:1 to 3:1, or 0.2:1 to 5:1, or 0.1:1 to 10:1, or 0.1:1 to 30:1. A particularly useful range is from 0.5:1 to 10:1, and preferably from 1:1 to 5:1.

Scavengers, Chain Transfer Agents and/or Co-activator

Scavengers, chain transfer agents or co-activators can also be used. Alkyl aluminum compounds, hydrogen alkyl aluminum compounds, and alkyl aluminum halide compounds can be used as scavengers or co-activators in the catalyst systems described herein. Examples of alkyl aluminum compounds include those represented by the formula $AlR_3$, wherein each R is independently a C1-C8 aliphatic group, preferably methyl, ethyl, propyl, butyl, pentyl, hexyl, octyl or their isomers, especially trimethylaluminum, triethylaluminum, triisobutylaluminum, tri-n-hexylaluminum, tri-n-octylaluminum or their mixtures. Examples of hydrogen alkyl aluminum compounds and alkyl aluminum halide compounds include diethylaluminum hydride, diisobutylaluminum hydride, diethylaluminum chloride, diisobutylaluminum chloride, ethyl aluminum sesquichloride and ethylaluminum dichloride.

In some embodiments, the catalyst system of the present invention comprises the main catalyst, an organoboron compound as an activator, and an organoaluminum compound, such as an aluminum alkyl/an alkyl aluminum halide and/or an aluminoxane, as a co-activator, and their appropriate molar ratio is within the knowledge of those skilled in the art. For example, the molar ratio of the main catalyst (in terms of the metal in the catalyst compound) to the organoboron compound (in terms of boron) to the organoaluminum compound (in terms of aluminum) may be 1:(1-10):(100-2000), preferably 1:(2-8):(200-1000).

Useful chain transfer agents that can also be used herein are typically compounds represented by Formula $AlR^{20}_3$ or $ZnR^{20}_2$ (wherein each $R^{20}$ is independently a C1-C8 aliphatic group, preferably methyl, ethyl, propyl, butyl, pentyl, hexyl, octyl or their isomers) or a combination thereof, such as diethyl zinc, trimethyl aluminum, triisobutyl aluminum, trioctyl aluminum, or a combination thereof.

Support Material

In some embodiments, the main catalyst component may optionally comprise a support or is disposed on at least one support. For example, the catalyst compound may be supported on at least one "support" (sometimes also referred to as a "carrier"), thereby providing the main catalyst component of the catalyst system of the present invention. Here, the terms "carrier" and "support" are used interchangeably. Suitable supports include, but are not limited to, synthetic or naturally occurring zeolites, and inorganic materials such as clays and/or inorganic oxides, including Groups 2, 4, 13 and 14 metal oxides, such as silica, alumina, silica-alumina, zirconia, titania, ceria, magnesia, montmorillonite, phyllosilicate, talc, or a combination thereof. In particular, the support may be silica-alumina, silica, alumina, zirconia and/or a zeolite. The silica-alumina can be naturally occurring or in the form of gelled precipitates or gels, including mixtures of silica and alumina. Preferably, the support material is an inorganic oxide in a finely divided form. However, other suitable support materials can be used, such as finely divided polyethylene and finely divided polystyrene. In addition, a combination of these support materials can be used.

In a second aspect, the present invention relates to an olefin polymerization process in which an olefin monomer such as ethylene and an optional comonomer are contacted with the above-described catalyst system of the present invention. The main catalyst component comprising the catalyst compound and an optional support and the activator/cocatalyst may be combined in any order, and typically prior to contacting with the monomer(s).

Thus, the application of the above-described catalyst system of the present invention in olefin polymerization (including homopolymerization and copolymerization) is also within the scope of the present invention.

Monomers

Monomers that can be used in the olefin polymerization processes of the present invention include C2-C12 olefin monomers, preferably C2-C12 α-olefin monomers, for example, ethylene, propylene, 1-butene, 1-pentene, 1-hexene, 1-heptene, 1-octene, 1-nonene, 1-decene, 1-undecene, 1-dodecene and combinations thereof. Preferably, the olefin monomer is ethylene.

In some embodiments of the present invention where a copolymerization reaction occurs, the copolymerization reaction includes the copolymerization reaction of ethylene and other α-olefins. Exemplary comonomers include propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorborndiene, and their substituted derivatives, and their isomers, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologues and derivatives. Preference is given to norbornene, norbornadiene and dicyclopentadiene. Preferably, the α-olefin comonomer includes one or more of C3-C12 α-olefins, preferably propylene, butene, pentene, hexene, heptene, octene, nonene, decene, undecene, dodecene and their isomers such as 4-methyl-1-pentene.

In some embodiments of the present invention where a copolymerization reaction occurs, the comonomer is present at an amount of at most 40 mol %, for example, at most 30 mol %, or at most 20 mol %, or at most 18 mol %, or at most 16 mol %, or at most 14 mol %, based on the total amount of the monomer and the comonomer.

In some embodiments, one or more dienes are present in the polymer produced herein at an amount of up to 10 wt %, preferably 0.00001-1.0 wt %, preferably 0.002-0.5 wt %, even more preferably 0.003-0.2 wt %, based on the total weight of the polymer. In some embodiments, 500 ppm or less, preferably 400 ppm or less, preferably 300 ppm or less of diene is added to the polymerization. In other embodiments, at least 50 ppm, or at least 100 ppm, or at least 200 ppm of diene is added to the polymerization.

Diolefin monomers useful in this invention include any hydrocarbon structure, preferably C4 to C30, having at least two unsaturated bonds, wherein at least two of the unsaturated bonds are readily incorporated into a polymer by either a stereospecific or a non-stereospecific catalyst(s). Preferably, the diolefin monomers are selected from alpha,omega-diene monomers (i.e., di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, and particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbomadiene, ethylidene norbornene, divinylbenzene, dicyclopentadiene or higher ring containing diolefins with or without substituents at various ring positions.

Polymerization Processes

The polymerization processes of this invention can be carried out in any manner known in the art. Any solution, suspension, slurry, either high pressure loop or high-pressure tank, processes or gas phase polymerization process known in the art can be used under polymerizable conditions. Such processes can be operated in a batch, semi-batch, or continuous mode.

Preferred polymerization can be run at any temperature and/or pressure suitable to obtain desired olefin polymers. Typical temperatures include a temperature in the range of from 30 to 150° C., preferably from 50 to 140° C., or preferably from 60 to 130° C., or preferably from 70 to 120° C. Typical pressures include a pressure in the range of from about 0.35 MPa to about 10 MPa, preferably from about 0.45 MPa to about 6 MPa, or preferably from about 0.5 MPa to about 4 MPa.

In some embodiments, hydrogen is present in the polymerization reactor at a partial pressure of from 0.001 to 50 psig (0.007 to 345 kPa), preferably from 0.01 to 25 psig (0.07 to 172 kPa), and more preferably from 0.1 to 10 psig (0.7 to 70 kPa).

In some embodiments, the polymerization processes of the present disclosure are performed as heterogeneous polymerization processes (e.g., gas phase and slurry phase processes). The heterogeneous process is defined as a process where the catalyst system is insoluble in the reaction medium. In some embodiments, the process is a slurry process. As used herein, the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent). Suitable diluents/solvents for polymerization include non-coordinating inert liquids. Examples include linear and branched-chain aliphatic hydrocarbons, typically alkanes having 3-7 carbon atoms, preferably branched alkanes, such as isobutane, butane, pentane, isopentane, hexane, isohexane, heptane, octane, dodecane, and mixtures thereof; cyclic and alicyclic hydrocarbons, such as cyclohexane, cycloheptane, methylcyclohexane, methylcycloheptane, and mixtures thereof; halogenated hydrocarbons, such as perfluorinated C4-10 alkanes and chlorobenzene; and aromatic and alkyl-substituted aromatic compounds, such as benzene, toluene, 1,3,5-trimethylbenzene, and xylene. Suitable solvents also include liquid olefins that can be used as monomers or comonomers, including ethylene, propylene, 1-butene, 1-hexene, 1-pentene, 3-methyl-1-pentene, 4-methyl-1-pentene, 1-octene, 1-decene, and mixtures thereof. In an embodiment, the solvent is not aromatic, and preferably aromatic hydrocarbons are present in the solvent in an amount of less than 1 wt %, preferably less than 0.5 wt %, preferably 0 wt %, based on the weight of the solvent. In an embodiment, the feed concentration of monomers and comonomers used in the polymerization is 60 vol % or less, preferably 40 vol % or less, more preferably 20 vol % or less, based on the total volume of the feed stream.

A slurry polymerization process is generally operated under a pressure between 1 and about 50 atm (15 psi to 735 psi, 103 kPa to 5068 kPa) at the above-described temperature range. In a slurry polymerization, a suspension of solid, particulate polymer is formed in a liquid polymerization diluent medium to which monomer and comonomer along with catalyst are added. The suspension including diluent is intermittently or continuously removed from the reactor, and volatile components are separated from the polymer and recycled, optionally after a distillation, to the reactor. The diluent medium employed should be liquid under the conditions of polymerization and relatively inert. When a propane medium is used the process is typically operated above the reaction diluent critical temperature and pressure. Frequently, a hexane or an isobutane medium is employed. In the slurry polymerization processes, the preferred temperature is within the range of about 85° C. to about 110° C. Two preferred slurry polymerization processes are those employing a loop reactor and those utilizing a plurality of stirred reactors in series, parallel, or combinations thereof. In an embodiment, the slurry process is carried out continuously in a loop reactor. The catalyst, as a slurry in isobutane or as a dry free flowing powder, is injected regularly to the reactor loop, which itself is filled with circulating slurry of growing polymer particles in a diluent of isobutane containing monomer and comonomer. Optionally, hydrogen may be added as a molecular weight control. For example, 500 ppm or less of hydrogen is added, or 400 ppm or less or 300 ppm or less. The lower limit of the concentration of hydrogen can be 50 ppm, or 100 ppm, or 150 ppm. Reaction heat may be removed through the loop wall. The slurry is allowed to exit the reactor at regular intervals or continuously to a heated low-pressure flash vessel, rotary dryer and a nitrogen purge column in sequence for removal of the isobutane diluent and all unreacted monomer and comonomers. The resulting hydrocarbon free powder is then compounded for use in various applications.

In some embodiments, the polymerization process is carried out as a gas phase process, preferably as a fluidized bed gas phase process. Generally, in a fluidized bed gas phase process used for producing polymers, a gaseous stream containing one or more monomers is continuously cycled through a fluidized bed in the presence of a catalyst under polymerizable conditions. The gaseous stream is withdrawn from the fluidized bed and recycled back into the reactor. Simultaneously, polymer product is withdrawn from the reactor and fresh monomer is added to replace the polymerized monomer.

In other embodiments, the polymerization process is homogeneous. The homogeneous polymerization process is defined as one in which at least 90% by weight of the product is soluble in the reaction medium. In other embodiments, the polymerization process is a bulk process. The bulk process is defined as one in which the monomer concentration in all feeds to the reactor is 70 vol % or more.

In some embodiments, the polymerization is carried out in a solution process. The temperature for the polymerization may be from −30 to 150° C., preferably from 25 to 100° C. or from 50 to 110° C. The pressure for the polymerization may be from 0.1 to 10 MPa, and preferably from 0.5 to 4 MPa. The duration of the polymerization may be from 10 to 60 minutes. The polymerization reaction can be carried out in an inert solvent. The solvent used may be an arene or alkane, such as benzene, toluene, hexane, heptane, or a mixture thereof.

A "reaction zone", also referred to as a "polymerization zone", is a vessel where polymerization takes place, for example a continuous reactor or a batch reactor.

When multiple reactors are used in a series or parallel configuration, each reactor is considered as a separate polymerization zone. For multi-stage polymerization in batch reactors and continuous reactors, each polymerization stage is considered as a separate polymerization zone. In a preferred embodiment, the polymerization is carried out in one reaction zone.

For the production of polyolefin polymers, useful reactor types and/or processes include, but are not limited to, UNIPOL™ gas phase reactor (available from Univation Technologies); INEOS™ gas phase reactor and process; continuous flow stirred tank (CSTR) reactor (solution and slurry); plug flow tube reactor (solution and slurry); slurry (e.g., slurry loop (single or double loop) (available from Chevron Phillips Chemical Company) and reactors in series (available from Mitsui Chemicals)); BORSTAR™ process and reactor (a combination of slurry and gas phase reactors); and multi-zone circulation reactor (MZCR), for example, SPHERIZONE™ reactor and process available from Lyondell Basell.

In some embodiments, the present invention provides an ethylene homopolymerization process, comprising polymerizing ethylene monomer in the presence of the catalyst comprising the main catalyst, which comprises the above-described bisphenol metal complex and an optional support, and a cocatalyst. The molecular weight of polyethylene prepared by the ethylene homopolymerization process can be higher than 200,000, and the polydispersity can be in the range of from 1.5 to 20.

In some embodiments, the ethylene homopolymerization 1) is performed in the presence of the catalyst system comprising the main catalyst and the cocatalyst, the cocatalyst including an organoaluminum compound and an organoboron compound, in some embodiments, the organoaluminum compound is selected from the group consisting of aluminum alkyls, alkyl aluminum halides and alkylaluminoxanes, for example, trimethylaluminum, triethylaluminum, triisobutylaluminum, tri-n-hexylaluminum, trioctylaluminum, diethylaluminum hydride, diisobutylaluminum hydride, diethylaluminum chloride, diisobutylaluminum chloride, ethyl aluminum sesquichloride, ethylaluminum dichloride, methylaluminoxane and modified methylaluminoxane, In some embodiments, the organoboron compound is selected from the group consisting of aromatic hydrocarbyl boron compounds and borates, for example, substituted or unsubstituted phenyl boron, such as tris(pentafluorophenyl) boron, N,N-dimethylanilinium tetrakis(pentafluorophenyl) borate and triphenylcarbonium tetrakis(pentafluorophenyl) borate, In some embodiments, a molar ratio of the main catalyst (in terms of the metal in the catalyst compound) to the organoboron compound (in terms of boron) to the organoaluminum compound (in terms of aluminum) is 1: (1-10):(100-2000), and preferably 1:(2-8):(200-1000); or 2) is performed in the presence of the catalyst system comprising the main catalyst and the cocatalyst, the cocatalyst comprising an aluminoxane, in some embodiments, a molar ratio of the main catalyst (in terms of the metal in the catalyst compound) to the aluminoxane (in terms of aluminum) is 1:(200-5000), and preferably 1:(2000-3000), in some embodiments, the aluminoxane has a general formula:

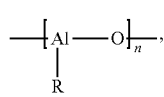

Formula VI wherein, R is a $C_1$-$C_{12}$ hydrocarbyl, and preferably methyl or isobutyl, and preferably the aluminoxane is methylaluminoxane (MAO) or modified methylaluminoxane, more preferably methylaluminoxane.

Further, in some embodiments, the ethylene homopolymerization 3) is performed at a temperature of −30 to 150° C., and preferably 50 to 110° C.;

4) is performed under a pressure of 0.1 to 10 MPa, and preferably 0.5 to 4 MPa;

5) is performed for a period of time of 10 to 60 minutes; and/or 6) is performed in an inert solvent, wherein the solvent may be an arene or an alkane, for example, benzene, toluene, hexane, heptane and a mixture thereof.

In some embodiments, the present invention provides an ethylene copolymerization process, wherein ethylene and a comonomer are polymerized in the presence of the catalyst comprising the bisphenol metal complex-containing main catalyst and a cocatalyst. The weight average molecular weight of polyethylene prepared by the ethylene copolymerization process can be higher than 200,000, the molecular weight distribution is between 2-10, and the molar content of the comonomer, based on the total monomers, is 1-30%.

In some embodiments, the ethylene copolymerization 1) is performed in the presence of the catalyst system comprising the main catalyst and the cocatalyst, the cocatalyst including an organoaluminum compound and an organoboron compound, in some embodiments, the organoaluminum compound is selected from the group consisting of aluminum alkyls, alkyl aluminum halides and alkylaluminoxane, for example, trimethylaluminum, triethylaluminum, triisobutylaluminum, tri-n-hexylaluminum, trioctylaluminum, diethylaluminum hydride, diisobutylaluminum hydride, diethylaluminum chloride, diisobutylaluminum chloride, ethyl aluminum sesquichloride, ethylaluminum dichloride, methylaluminoxane and modified methylaluminoxane, in some embodiments, the organoboron compound is selected from the group consisting of aromatic hydrocarbyl boron compounds and borates, for example, substituted or unsubstituted phenyl boron, such as tris(pentafluorophenyl) boron, N,N-dimethylanilinium tetrakis(pentafluorophenyl) borate and triphenylcarbonium tetrakis(pentafluorophenyl) borate, in some embodiments, a molar ratio of the main catalyst (in terms of the metal in the catalyst compound) to the organoboron compound to the organoaluminum compound is 1:(1-10):(100-2000), preferably 1:(2-8):(200-1000); alternatively a molar ratio of the main catalyst to the organoboron compound to the organoaluminum compound is 1: (1-20):(200-2000), preferably 1:(1-10):(200-2000) or 1: (4-16): (300-1000); or 2) is performed in the presence of the catalyst system comprising the main catalyst and the cocatalyst, the cocatalyst comprising an aluminoxane, in some embodiments, a molar ratio of the main catalyst (in terms of the metal in the catalyst compound) to the aluminoxane (in terms of aluminum) is 1:(200-5000), preferably 1:(2000-3000), in some embodiments, the aluminoxane has a general formula:

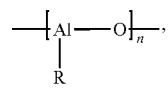

Formula VI wherein, R is a $C_1$-$C_{12}$ hydrocarbyl, and preferably methyl or isobutyl, and preferably the aluminoxane is methylaluminoxane (MAO) or modified methylaluminoxane, more preferably methylaluminoxane.

Further, in some embodiments, the ethylene copolymerization 3) utilizes the comonomer including an α-olefin and/or a diene, preferably a C4-C10 α-olefin and/or diene, for example, one or more of propylene, butene, pentene, hexene, octene and 4-methyl-1-pentene;

4) is performed at a temperature of −30 to 150° C., and preferably 25-100° C.;

5) is performed under a pressure of 0.1 to 110 MPa, and preferably 0.5 to 4 MPa;

6) is performed for a period of time of 10 to 60 minutes; and/or 7) is performed in an inert solvent, wherein the solvent may be an arene or an alkane, for example, benzene, toluene, hexane, heptane and a mixture thereof.

Polyethylene Products

In an embodiment, the methods described herein produce polyethylene compositions, including homopolymers of ethylene and copolymers of ethylene and one, two, three, four or more C3-C20 olefin monomers such as C3-C12 α-olefin monomers. For example, the polyethylene composition includes a copolymer of ethylene and one, two or three different C3-C20 olefins (wherein the C3-C20 olefin is preferably a C3-C12 α-olefin, preferably propylene, butene, hexene, octene, decene, dodecene, and more preferably propylene, butene, hexene, octene, or a mixture thereof).

The polyethylene composition may comprise 99.0 to about 80.0 wt %, 99.0 to 85.0 wt %, 99.0 to 87.5 wt %, 99.0 to 90.0 wt %, 99.0 to 92.5 wt %, 99.0 to 95.0 wt %, or 99.0 to 97.0 wt % of ethylene-derived polymeric units and about 1.0 to about 20.0 wt %, 1.0 to 15.0 wt %, 0.5 to 12.5 wt %, 1.0 to 10.0 wt %, 1.0 to 7.5 wt %, 1.0 to 5.0 wt %, or 1.0 to 3.0 wt % of polymeric units derived from one or more of C3-C20 α-olefin comonomers, preferably C3-C12 α-olefin, more preferably C4-C8 α-olefin, for example, hexene and octene. The a-olefin comonomer may be linear or branched, and two or more comonomers may be used if necessary. Examples of suitable comonomers include propylene; butene; 1-pentene; 1-pentene with one or more methyl, ethyl, or propyl substituents; 1-hexene; 1-hexene with one or more methyl, ethyl, or propyl substituents; 1-heptene; 1-heptene with one or more methyl, ethyl or propyl substituents; 1-octene; 1-octene with one or more methyl, ethyl or propyl substituents; 1-nonene; 1-nonene with one or more methyl, ethyl or propyl substituents; ethyl, methyl or dimethyl-substituted 1-decene; 1-dodecene; and styrene. Particularly suitable comonomers include 1-butene, 1-hexene, 1-octene and mixtures thereof.

The polyethylene composition may have a desired melt index ($I_{2.16}$). The lower limit of a suitable melt index ($I_{2.16}$) can be, for example, about 0.01 g/10 min, about 0.05 g/10 min, about 0.10 g/10 min, about 0.15 g/10 min, about 0.20 g/10 min, about 0.30 g/10 min, about 0.50 g/10 min, about 1.0 g/10 min, about 2.0 g/10 min, or about 3.0 g/10 min, and the upper limit of a suitable melt index ($I_{2.16}$) can be, for example, about 200 g/10 min, about 150 g/10 min, about 100 g/10 min, about 50 g/10 min, about 40 g/10 min, about 30 g/10 min, about 20 g/10 min, about 10 g/10 min, about 5 g/10 min, about 3.0 g/10 min, about 2.0 g/10 min, about 1.0 g/10 min, about 0.7g/10 min, measured according to ASTM D-1238 test method under 2.16 kg load at 190° C. The explicitly disclosed ranges include, but are not limited to, a range formed by combining an upper limit with a lower limit listed above, provided that the upper limit is greater than the lower limit.

The polyethylene composition may have a desired high load melt index (HLMI) ($I_{21.6}$). The lower limit of a suitable high load melt index (HLMI) ($I_{21.6}$) may be, for example, 1 g/10 min, 2g/10 min, 3 g/10 min, 5 g/10 min, 10 g/10 min, 20g/10 min, 30g/10 min, 50 g/10 min, and the upper limit of a suitable high load melt index (HLMI) ($I_{21.6}$) may be, for example, 500 g/10min, 400 g/10 min, 300 g/10 min, 200 g/10 min, 100 g/10 min, 80 g/10 min, 70 g/10 min, 60 g/10 min, or 50 g/10 min, measured according to ASTM D-1238 test method under 21.6 kg load at 190° C. (HLMI). The explicitly disclosed ranges include, but are not limited to, a range formed by combining an upper limit with a lower limit listed above, provided that the upper limit is greater than the lower limit.

The polyethylene composition may have a melt index ratio (MIR) of 4 to 100, or 5 to 90, 7 to 90, or 10 to 80, or 10 to 60, or 20 to 60, or 25 to 60, or 30 to 55, or 35 to 55, or 35 to 50. The MIR is defined as $I_{21.3}/I_{2.16}$.

The polyethylene composition may have a desired density. The lower limit of a suitable density range may be, for example, about 0.880 g/cm$^3$, about 0.890 g/cm$^3$, about 0.900 g/cm$^3$, about 0.910 g/cm$^3$, about 0.918 g/cm$^3$, about 0.919 g/cm$^3$, about 0.920 g/cm$^3$, about 0.925 g/cm$^3$, about 0.930 g/cm$^3$, or about 0.932 g/cm$^3$, and the upper limit of a suitable density range may be, for example, about 0.960 g/cm$^3$, about 0.950g/cm$^3$, about 0.945 g/cm$^3$, about 0.940 g/cm$^3$, about 0.937 g/cm$^3$, about 0.935g/cm$^3$, about 0.933 g/cm$^3$, about 0.930 g/cm$^3$, about 0.920 g/cm$^3$, or about 0.915g/cm$^3$. The explicitly disclosed ranges include, but are not limited to, a range formed by combining an upper limit with a lower limit listed above, provided that the upper limit is greater than the lower limit. The density is determined by ASTM D1505 method. The sample is molded according to ASTM D4703-10a procedure C, and then conditioned according to ASTM D618-08 (23°±2° C. and 50±10% relative humidity) for 40 hours before testing.

The polyethylene composition may have a molecular weight distribution (MWD, which is defined as Mw/Mn) of from about 2 to about 12, from about 2 to about 10, or from about 2 to about 8, from about 2.2 to about 5.5, or from about 2.4 to 5.0.

In any of the embodiments described herein, the polyethylene composition may be a multimodal polyethylene composition, such as a bimodal polyethylene composition, or the polyethylene composition may be a non-bimodal polyethylene composition such as a unimodal polyethylene composition. As used herein, "multimodal" means that there are at least two distinguishable peaks in the molecular weight distribution curve (determined by gel permeation chromatography (GPC) or other recognized analytical techniques) of the polyethylene composition. For example, if there are two distinguishable peaks in the molecular weight distribution curve, such a composition can be referred to as a bimodal composition. Typically, if there is only one peak (e.g., a single peak), there is no obvious valley between peaks, one of the peaks is not considered to be a distinguishable peak or both peaks are not considered to be distinguishable peaks, then such a composition can be referred to as being non-bimodal. Frequently, the bimodal molecular weight distribution is characterized by having an identifiable high molecular weight component (or distribution) and an identifiable low molecular weight component (or distribution). Representative non-bimodal molecular weight distribution curves include unimodal molecular weight distribution curves and distribution curves containing two peaks that cannot be easily distinguished, separated, or deconvolved.

In any of the embodiments described herein, the polyethylene composition may have more than 0.2 total internal unsaturations/1000 carbon atoms, or more than 0.3 total internal unsaturations/1000 carbon atoms, or more than 0.32 total internal unsaturations/1000 carbon atoms, or more than 0.38 total internal unsaturations/1000 carbon atoms, or more than 0.4 total internal unsaturations/1000 carbon atoms, measured by $^1$HNMR.

EXAMPLES

The present invention will be further described below in conjunction with specific examples, but the examples do not constitute any limitation on the present invention.

Evaluation and test methods involved in the following examples are as follows:

1. The proton nuclear magnetic spectra and carbon nuclear magnetic spectra of the catalysts are recorded at room temperature on a Bruker-400 nuclear magnetic resonance instrument with deuterated chloroform as the solvent.

2. High-resolution mass spectra are recorded on Bruker ESI-Q/TOF MS mass spectrometer using acetonitrile as a dispersing solvent.

3. Polymerization activity: A polymer obtained by polymerization is dried and weighed, and dividing the weight of the polymer by the amount of catalyst added during polymerization gives the catalyst activity.

4. Molecular weight and molecular weight distribution PDI (PDI=Mw/Mn) of polymer: measured by using PL-GPC220 at 150° C., with 1,2,4-trichlorobenzene as solvent (standards: PS; flow rate: 1.0 mL/min; Column 3×Plgel 10 um M1×ED-B 300×7.5 nm).

5. The melting point of the polymer is determined by differential scanning calorimetry (DSC) as follows: A 10 mg sample is placed in a crucible and measured on a Pekin Elmer DSC 8500 differential scanning calorimeter. Under nitrogen atmosphere, the temperature is increased from −70° C. to 200° C. at a ramp rate of 10° C./min and maintained for 1 min, and then the temperature is reduced to −70° C. at a rate of 10° C./min and maintained for 3 minutes. Then, the temperature is increased to 200° C. at a rate of 10° C./min again, and the data of the second heating scan are recorded.

6. The content of comonomer in the polymer is determined through high temperature nuclear magnetic carbon spectrum.

Example 1—Preparation of Bisphenol Metal Complex 7

Bisphenol compound 3 (2.24 mmol) was dissolved in diethyl ether solvent, and neat KH solid (8.96 mmol) was added to the resulting solution at −78° C. After reacting for 1 hour, the reaction mixture was warmed to room temperature, and the reaction was then continued for further 2 hours. Next, the solution was transferred to a solution of metal complex 2 (4.48 mmol) in dichloromethane at −78° C. through a transfer conduct. After reacting at that temperature for 1 hour, the reaction mixture was gradually warmed to room temperature, and the reaction was then continued for further 12 hours. Upon the completion of the reaction, the solvent was removed with a vacuum line, and the residue was washed with dichloromethane and filtered through Celite. The filtrate was evaporated to dry under vacuum, and the crude product was recrystallized with dichloromethane/n-hexane to afford an orange target product at a yield of 90%. The orange product is characterized as follows:

$^1$H NMR (CDCl$_3$, 400 MHz): δ=7.45 (dd, J=7.6, 2.0 Hz, 2H, aryl-H), 7.25 (s, 4H, aryl-H), 7.14-7.21 (m, 4H, aryl-H), 3.13 (m, 4H, CH), 2.18 (s, 30H, CH$_3$), 1.80 (s, 6H, CH$_3$), 1.03 (d, J=6.8 Hz, 24H, CH$_3$).

$^{13}$C NMR (CDCl$_3$, 100 MHz): δ=159.1, 146.9, 138.9, 133.5, 132.8, 130.6, 130.4, 130.0, 124.5, 122.9, 34.3, 33.9, 26.3, 24.3, 13.1.

ESI-MS for C$_{59}$H$_{72}$Cl$_4$O$_3$Ti$_2$(M/Z=1064.32), found: M=1064.34.

Example 2—Preparation of Bisphenol Metal Complex 7

Bisphenol compound 3 (2.24 mmol) was dissolved in diethyl ether solvent, and neat KH solid (22.4 mmol) was added to the resulting solution at 40° C. After reacting for 1 hour, the reaction mixture was cooled to room temperature, and the reaction was then continued for further 0.5 hours. Next, the solution was transferred to a solution of metal complex 2 (4.93 mmol) in dichloromethane at 40° C. through a transfer conduct, and the mixture was allowed to react at that temperature for 6 hours. Upon the completion of the reaction, the solvent was removed with a vacuum line, and the residue was washed with dichloromethane and filtered through Celite. The filtrate was evaporated to dry under vacuum, and the crude product was recrystallized with dichloromethane/n-hexane to afford an orange target product at a yield of 73%.

Example 3—Preparation of Bisphenol Metal Complex 4

Bisphenol compound 4 (2.00 mmol) was dissolved in tetrahydrofuran solvent, and neat NaH solid (12.00 mmol) was added to the resulting solution at −10° C. After reacting for 1 hour, the reaction mixture was warmed to room temperature, and the reaction was then continued for further 1 hour. Next, the solution was transferred to a solution of metal complex 1 (4.00 mmol) in tetrahydrofuran at −10° C. through a transfer conduct. After reacting at that temperature for 0.5 hours, the reaction mixture was gradually warmed to room temperature, and the reaction was then continued for further 8 hours. Upon the completion of the reaction, the solvent was removed with a vacuum line, and the residue was washed with dichloromethane and filtered through Celite. The filtrate was evaporated to dry under vacuum, and the crude product was recrystallized with dichloromethane/n-hexane to afford an orange target product at a yield of 92%. The orange product is characterized as follows:

ESI-MS for C$_{51}$H$_{56}$Cl$_4$O$_3$Ti$_2$: M/Z=954.21

Example 4—Preparation of Bisphenol Metal Complex A

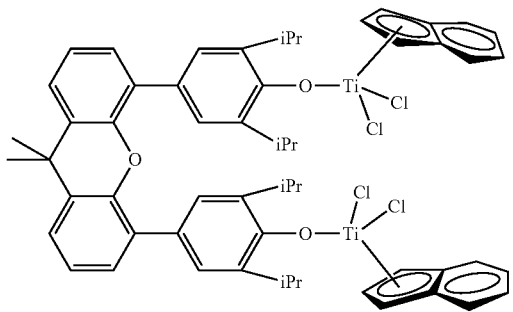

Bisphenol metal complex A

Bisphenol compound 3 (2.24 mmol) was dissolved in diethyl ether solvent, and n-BuLi (4.48 mmol, 1.6 mol/L) was added to the resulting solution at −78° C. After reacting for 1 hour, the reaction mixture was warmed to room temperature, and the reaction was then continued for further 2 hours. Next, the solution was transferred to a solution of indenyl titanium complex (4.48 mmol) in diethyl ether at −78° C. through a transfer conduct. After reacting at that temperature for 1 hour, the reaction mixture was gradually warmed to room temperature, and the reaction was then continued for further 12 hours. Upon the completion of the reaction, the solvent was removed with a vacuum line, and the residue was washed with dichloromethane and filtered through Celite. The filtrate was evaporated to dry under vacuum, and the crude product was recrystallized with dichloromethane/n-hexane to afford a purple-red target product at a yield of 60%.

$^1$H NMR (CDC$_3$, 400 MHz): δ=7.74 (dd, J=6.4, 2.8 Hz, 4H, aryl-H), 7.47 (t, J =4.8 Hz, 2H, aryl-H), 7.37 (dd, J=6.4, 2.8 Hz, 4H, aryl-H), 7.22 (s, 4H, aryl-H), 7.18 (d, J=4.8 Hz, 4H, aryl-H), 6.78 (d, J=3.6 Hz, 4H, aryl-H), 6.42 (t, J=3.2 Hz, 2H, aryl-H), 3.25 (sept, 4H, CH), 2.18 (s, 30H, CH$_3$), 1.82(s, 6H, CH$_3$), 1.08 (d, J=6.8 Hz, 24H, CH$_3$).

$^{13}$C NMR (CDCl$_3$, 100 MHz): δ=164.5, 146.8, 138.5, 134.6, 130.6, 130.3, 129.9, 129.7, 128.3, 125.9, 125.8, 124.5, 123.0, 120.4, 113.3, 34.2, 34.0, 26.8, 23.8

Example 5—Preparation of Bisphenol Metal Complex B

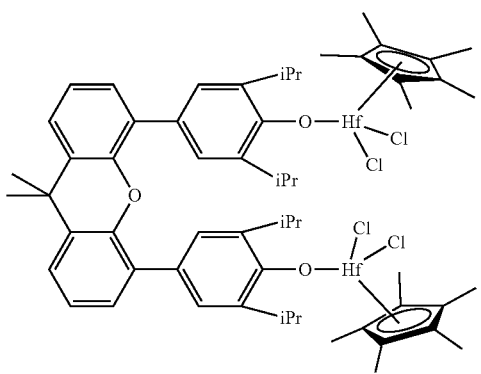

Bisphenol compound 3 (1.00 mmol) was dissolved in tetrahydrofuran solvent, and n-BuLi (2.00 mmol, 1.6 mol/L) was added to the resulting solution at −78° C. After reacting for 1 hour, the reaction mixture was warmed to room temperature, and the reaction was then continued for further 2 hours. Next, the solution was transferred to a solution of pentamethylcyclopentadienyl hafnium complex (2.00 mmol) in tetrahydrofuran at −78° C. through a transfer conduct. After reacting at that temperature for 1 hour, the reaction mixture was gradually warmed to room temperature and then heated to 50° C., and the reaction was then continued for further 12 hours. Upon the completion of the reaction, the solvent was removed with a vacuum line, and the residue was washed with dichloromethane and filtered through Celite. The filtrate was evaporated to dry under vacuum, and the crude product was recrystallized with dichloromethane/n-hexane to afford a purple target product at a yield of 21%.

$^1$H NMR (CDCl$_3$, 400 MHz): δ=7.40 (dd, J=7.4, 2.2 Hz, 2H, aryl-H), 7.16–7.11 (m, 4H, aryl-H), 7.08 (s, 4H, aryl-H), 2.93 (sept, 4H, CH), 2.22 (s, 30H, CH$_3$), 1.77 (s, 6H, CH$_3$), 1.04 (d, J=6.8Hz, 24H, CH$_3$).

Example 6

After having been dried by heating, a 500 mL polymerization autoclave was evacuated and then filled with nitrogen gas twice, following by evacuating and then filling with ethylene gas once. Then, 10 mL of 2 mmol/mL solution of methylaluminoxane (MAO) in toluene, 150 mL of n-hexane having subjected to de-oxygenation and de-watering treatment, and 1 mL of a solution (5 μmol/mL) of bisphenol metal complex 7 in toluene were added successively. With mechanical stirring, ethylene under a pressure of 1.0 MPa was introduced thereinto, and the reaction was allowed to continue at 20° C. under that pressure for 20 minutes, and then ethanol was added to terminate the reaction. 2.8 g of polyethylene polymer was obtained. The polymerization activity was calculated as 8.4×10$^5$ g·mol$^{−1}$(Ti)·h$^{−1}$. The melting point measured by DSC was 133.5° C.; the Mw measured by GPC was 1.9 ×10$^5$, and the Mw/Mn was found to be 4.82.

Example 7

After having been dried by heating, a 500 mL polymerization autoclave was evacuated and then filled with nitrogen gas twice, following by evacuating and then filling with ethylene gas once. Then, 5 mL of 2 mmol/mL solution of methylaluminoxane (MAO) in toluene, 150 mL of n-hexane having subjected to de-oxygenation and de-watering treatment, and 1 mL of a solution (5 μmol/mL) of bisphenol metal complex 7 in toluene were added successively. With mechanical stirring, ethylene under a pressure of 0.5 MPa was introduced thereinto, and the reaction was allowed to continue at 20° C. under that pressure for 20 minutes, and then ethanol was added to terminate the reaction. 2.0 g of polyethylene polymer was obtained. The polymerization activity was calculated as 6.0×10$^5$ g·mol·$^{−1}$(Ti)·h$^{−1}$. The melting point measured by DSC was 131.9° C.; the Mw measured by GPC was 2.1 ×10$^5$, and the Mw/Mn was found to be 6.02.

Example 8

After having been dried by heating, a 500 mL polymerization autoclave was evacuated and then filled with nitrogen gas twice, following by evacuating and then filling with ethylene gas once. Then, 5 mL of 2 mmol/mL solution of methylaluminoxane (MAO) in toluene, 150 mL of n-hexane having subjected to de-oxygenation and de-watering treatment, and 1 mL of a solution (5 μmol/mL) of bisphenol metal complex 7 in toluene were added successively. With mechanical stirring, ethylene under a pressure of 0.1 MPa was introduced thereinto, and the reaction was allowed to continue at 20° C. under that pressure for 20 minutes, and then ethanol was added to terminate the reaction. 2.79 g of polyethylene polymer was obtained. The polymerization activity was calculated as 1.7×10$^6$ g·mol$^{−1}$(Ti)·h$^{−1}$. The melting point measured by DSC was 132.7° C.; the Mw measured by GPC was 1.8 ×10$^5$, and the Mw/Mn was found to be 7.87.

Example 9

After having been dried by heating, a 500 mL polymerization autoclave was evacuated and then filled with nitrogen gas twice, following by evacuating and then filling with ethylene gas once. Then, 5 mL of 2 mmol/mL solution of methylaluminoxane (MAO) in toluene, 150 mL of n-hexane having subjected to de-oxygenation and de-watering treatment, and 1 mL of a solution (5.0 μmol/mL) of bisphenol metal complex 7 in toluene were added successively. With mechanical stirring, ethylene under a pressure of 1.0 MPa was introduced thereinto, and the reaction was allowed to continue at 80° C. under that pressure for 20 minutes, and then ethanol was added to terminate the reaction. 3.1 g of polyethylene polymer was obtained. The polymerization activity was calculated as 9.3×10$^5$ g·mol(Ti)·h$^{−1}$. The melting point measured by DSC was 131.4° C.; the Mw measured by GPC was 2.2 ×10$^5$, and the Mw/Mn was found to be 5.17.

Example 10

After having been dried by heating, a 500 mL polymerization autoclave was evacuated and then filled with nitrogen gas twice, following by evacuating and then filling with ethylene gas once. Then, 5 mL of 2 mmol/mL solution of methylaluminoxane (MAO) in toluene, 150 mL of n-hexane having subjected to de-oxygenation and de-watering treatment, and 1 mL of a solution (5.0 μmol/mL) of bisphenol metal complex 7 in toluene were added successively. With mechanical stirring, ethylene under a pressure of 1.0 MPa was introduced thereinto, and the reaction was allowed to continue at 0° C. under that pressure for 20 minutes, and then ethanol was added to terminate the reaction. 3.6 g of polyethylene polymer was obtained. The polymerization activity was calculated as $1.1 \times 10^6$ g·mol$^{-1}$(Ti)·h$^{-1}$. The melting point measured by DSC was 134.2° C.; the Mw measured by GPC was $8.0 \times 10^4$, and the Mw/Mn was found to be 3.95.

Example 11

After having been dried by heating, a 500 mL polymerization autoclave was evacuated and then filled with nitrogen gas twice, following by evacuating and then filling with ethylene gas once. Then, 5 mL of 2 mmol/mL solution of methylaluminoxane (MAO) in toluene, 150 mL of n-hexane having subjected to de-oxygenation and de-watering treatment, and 1 mL of a solution (5.0 μmol/mL) of bisphenol metal complex 7 in toluene were added successively. With mechanical stirring, ethylene under a pressure of 1.0 MPa was introduced thereinto, and the reaction was allowed to continue at 20° C. under that pressure for 20 minutes, and then ethanol was added to terminate the reaction. 2.9 g of polyethylene polymer was obtained. The polymerization activity was calculated as $8.7 \times 10^5$ g·mol$^{-1}$(Ti)·h$^{-1}$. The melting point measured by DSC was 131.0° C.; the Mw measured by GPC was $2.1 \times 10^5$, and the Mw/Mn was found to be 10.1.

Example 12

After having been dried by heating, a 500 mL polymerization autoclave was evacuated and then filled with nitrogen gas twice, following by evacuating and then filling with ethylene gas once. Then, 2.5 mL of 2 mmol/mL solution of methylaluminoxane (MAO) in toluene, 150 mL of n-hexane having subjected to de-oxygenation and de-watering treatment, and 1 mL of a solution (5.0 pmol/mL) of bisphenol metal complex 7 in toluene were added successively. With mechanical stirring, ethylene under a pressure of 1.0 MPa was introduced thereinto, and the reaction was allowed to continue at 20° C. under that pressure for 20 minutes, and then ethanol was added to terminate the reaction. 2.6 g of polyethylene polymer was obtained. The polymerization activity was calculated as $7.8 \times 10^5$ g·mol$^{-1}$(Ti)·h$^{-1}$. The melting point measured by DSC was 133.2° C.; the Mw measured by GPC was $2.3 \times 10^5$, and the Mw/Mn was found to be 8.08.

Example 13

After having been dried by heating, a 500 mL polymerization autoclave was evacuated and then filled with nitrogen gas twice, following by evacuating and then filling with ethylene gas once. Then, 5 mL of 1 mmol/mL solution of modified methylaluminoxane (MMAO) in toluene, 150 mL of n-hexane having subjected to de-oxygenation and de-watering treatment, and 1 mL of a solution (5.0 μmol/mL) of bisphenol metal complex 7 in toluene were added successively. With mechanical stirring, ethylene under a pressure of 1.0 MPa was introduced thereinto, and the reaction was allowed to continue at 20° C. under that pressure for 20 minutes, and then ethanol was added to terminate the reaction. 3.3 g of polyethylene polymer was obtained. The polymerization activity was calculated as $9.9 \times 10^5$ g·mol$^{-1}$(Ti)·h$^{-1}$. The melting point measured by DSC was 132.5° C.; the Mw measured by GPC was $1.7 \times 10^5$, and the Mw/Mn was found to be 6.81.

Example 14

After having been dried by heating, a 500 mL polymerization autoclave was evacuated and then filled with nitrogen gas twice, following by evacuating and then filling with ethylene gas once. Then, 5 mL of 2 mmol/mL solution of methylaluminoxane (MAO) in toluene, 150 mL of n-hexane having subjected to de-oxygenation and de-watering treatment, and 2 mL of a solution (5 μmol/mL) of bisphenol metal complex 7 in toluene were added successively. With mechanical stirring, ethylene under a pressure of 1.0 MPa was introduced thereinto, and the reaction was allowed to continue at 20° C. under that pressure for 20 minutes, and then ethanol was added to terminate the reaction. 6.8 g of polyethylene polymer was obtained. The polymerization activity was calculated as $1.02 \times 10^6$ g·mol$^{-1}$(Ti)·h$^{-1}$.

The melting point measured by DSC was 132.4° C.; the Mw measured by GPC was $2.5 \times 10^5$, and the Mw/Mn was found to be 9.03.

Example 15

After having been dried by heating, a 500 mL polymerization autoclave was evacuated and then filled with nitrogen gas twice, following by evacuating and then filling with ethylene gas once. Then, 5 mL of 2 mmol/mL solution of methylaluminoxane (MAO) in toluene, 150 mL of n-hexane having subjected to de-oxygenation and de-watering treatment, and 1 mL of a solution (2.5 μmol/mL) of bisphenol metal complex 7 in toluene were added successively. With mechanical stirring, ethylene under a pressure of 1.0 MPa was introduced thereinto, and the reaction was allowed to continue at 20° C. under that pressure for 20 minutes, and then ethanol was added to terminate the reaction. 1.81 g of polyethylene polymer was obtained. The polymerization activity was calculated as $1.09 \times 10^6$ g·mol$^{-1}$(Ti)·h$^{-1}$. The melting point measured by DSC was 135.3° C.; the Mw measured by GPC was $2.5 \times 10^5$, and the Mw/Mn was found to be 7.84.

Example 16

After having been dried by heating, a 500 mL polymerization autoclave was evacuated and then filled with nitrogen gas twice, following by evacuating and then filling with ethylene gas once. Then, 5 mL of 2 mmol/mL solution of methylaluminoxane (MAO) in toluene, 150 mL of n-hexane having subjected to de-oxygenation and de-watering treatment, and 1 mL of a solution (5.0 μmol/mL) of bisphenol metal complex 7 in toluene were added successively. With mechanical stirring, ethylene under a pressure of 1.0 MPa was introduced thereinto, and the reaction was allowed to continue at 20° C. under that pressure for 30 minutes, and then ethanol was added to terminate the reaction. 3.5 g of polyethylene polymer was obtained. The polymerization activity was calculated as $7.0 \times 10^5$ g·mol$^{-1}$(Ti)·h$^{-1}$. The melting point measured by DSC was 131.2° C.; the Mw measured by GPC was 2.6 ×10$^5$, and the Mw/Mn was found to be 6.99.

Example 17

After having been dried by heating, a 500 mL polymerization autoclave was evacuated and then filled with nitrogen gas twice, following by evacuating and then filling with ethylene gas once. Then, 5 mL of 2 mmol/mL solution of methylaluminoxane (MAO) in toluene, 150 mL of n-hexane having subjected to de-oxygenation and de-watering treatment, and 1.0 mL of a solution (5.0 µmol/mL) of bisphenol metal complex 7 in toluene were added successively. With mechanical stirring, ethylene under a pressure of 1.0 MPa was introduced thereinto, and the reaction was allowed to continue at 20° C. under that pressure for 10 minutes, and then ethanol was added to terminate the reaction. 1.94 g of polyethylene polymer was obtained. The polymerization activity was calculated as 1.16×10$^6$ g·mol$^{-1}$(Ti)·h$^{-1}$.

The melting point measured by DSC was 132.6° C.; the Mw measured by GPC was 1.9 ×10$^5$, and the Mw/Mn was found to be 4.79.

Example 18

After having been dried by heating, a 500 mL polymerization autoclave was evacuated and then filled with nitrogen gas twice, following by evacuating and then filling with ethylene gas once. Then, 5 mL of 2 mmol/mL solution of methylaluminoxane (MAO) in toluene, 100 mL of toluene having subjected to de-oxygenation and de-watering treatment, and 1.0 mL of a solution (5.0 µmol/mL) of bisphenol metal complex 7 in toluene were added successively. With mechanical stirring, ethylene under a pressure of 1.0 MPa was introduced thereinto, and the reaction was allowed to continue at 20° C. under that pressure for 20 minutes, and then ethanol was added to terminate the reaction. 3.7 g of polyethylene polymer was obtained. The polymerization activity was calculated as 1.11×10$^6$ g·mol$^{-1}$(Ti)·h$^{-1}$. The melting point measured by DSC was 131.9° C.; the Mw measured by GPC was 2.0 ×10$^5$, and the Mw/Mn was found to be 6.69.

Example 19

After having been dried by heating, a 500 mL polymerization autoclave was evacuated and then filled with nitrogen gas twice, following by evacuating and then filling with ethylene gas once. Then, 2 mL of 0.5 mmol/mL solution of triisobutylaluminum in n-hexane, 150 mL of n-hexane having subjected to de-oxygenation and de-watering treatment, and 1 mL of a solution (2.5 µmol/mL) of bisphenol metal complex 7 in toluene were added successively, followed by the addition of 2 mL (5 µmol/mL) of a boron-containing reagent, [Ph$_3$C][B(C$_6$F$_5$)$_4$]. With mechanical stirring, ethylene under a pressure of 1.0 MPa was introduced thereinto, and the reaction was allowed to continue at 80° C. under that pressure for 20 minutes, and then ethanol was added to terminate the reaction. 5.1 g of polyethylene polymer was obtained. The polymerization activity was calculated as 3.06×10$^6$ g·mol$^{-1}$(Ti)·h$^{-1}$. The melting point measured by DSC was 133.3° C.; the Mw measured by GPC was 1.8×10$^5$, and the Mw/Mn was found to be 6.84.

Example 20

After having been dried by heating, a 500mL polymerization autoclave was evacuated and then filled with nitrogen gas twice, following by evacuating and then filling with ethylene gas once. Then, 2 mL of 0.5 mmol/mL solution of triisobutylaluminum in n-hexane, 150 mL of n-hexane having subjected to de-oxygenation and de-watering treatment, and 1 mL of a solution (2.5 µmol/mL) of bisphenol metal complex 7 in toluene were added successively, followed by the addition of 2 mL (5 pmol/mL) of a boron-containing reagent, [Ph$_3$C][B(C$_6$F$_5$)$_4$]. With mechanical stirring, ethylene under a pressure of 0.5 MPa was introduced thereinto, and the reaction was allowed to continue at 40° C. under that pressure for 20 minutes, and then ethanol was added to terminate the reaction. 2.6 g of polyethylene polymer was obtained. The polymerization activity was calculated as 1.56×10$^6$ g·mol$^{-1}$(Ti)·h$^{-1}$. The melting point measured by DSC was 130.6° C.; the Mw measured by GPC was 2.×10$^5$, and the Mw/Mn was found to be 7.05.

Example 21

After having been dried by heating, a 500 mL polymerization autoclave was evacuated and then filled with nitrogen gas twice, following by evacuating and then filling with ethylene gas once. Then, 2 mL of 0.5 mmol/mL solution of triisobutylaluminum in n-hexane, 150 mL of n-hexane having subjected to de-oxygenation and de-watering treatment, and 1 mL of a solution (2.5 µmol/mL) of bisphenol metal complex 7 in toluene were added successively, followed by the addition of 2 mL (5 µmol/mL) of a boron-containing reagent, [Ph$_3$C][B(C$_6$F$_5$)$_4$]. With mechanical stirring, ethylene under a pressure of 0.1 MPa was introduced thereinto, and the reaction was allowed to continue at 0° C. under that pressure for 20 minutes, and then ethanol was added to terminate the reaction. 1.15 g of polyethylene polymer was obtained. The polymerization activity was calculated as 6.90×10$^5$ g·mol$^{-1}$(Ti)·h$^{-1}$. The melting point measured by DSC was 131.5° C.; the Mw measured by GPC was 1.7×10$^5$, and the Mw/Mn was found to be 8.97.

Example 22

After having been dried by heating, a 500 mL polymerization autoclave was evacuated and then filled with nitrogen gas twice, following by evacuating and then filling with ethylene gas once. Then, 5 mL of 0.5 mmol/mL solution of triisobutylaluminum in n-hexane, 150 mL of n-hexane having subjected to de-oxygenation and de-watering treatment, and 1 mL of a solution (2.5 µmol/mL) of bisphenol metal complex 7 in toluene were added successively, followed by the addition of 4 mL (5 pmol/mL) of a boron-containing reagent, [Ph$_3$C][B(C$_6$F$_5$)$_4$]. With mechanical stirring, ethylene under a pressure of 0.5 MPa was introduced thereinto, and the reaction was allowed to continue at 80° C. under that pressure for 20 minutes, and then ethanol was added to terminate the reaction. 3.4 g of polyethylene polymer was obtained. The polymerization activity was calculated as 2.04×10$^6$ g·mol$^{-1}$(Ti)·h$^{-1}$. The melting point measured by DSC was 130.3° C.; the Mw measured by GPC was 1.5×10$^5$, and the Mw/Mn was found to be 4.10.

Example 23

After having been dried by heating, a 500 mL polymerization autoclave was evacuated and then filled with nitrogen gas twice, following by evacuating and then filling with ethylene gas once. Then, 1.5 mL of 0.5 mmol/mL solution of triisobutylaluminum in n-hexane, 150 mL of n-hexane having subjected to de-oxygenation and de-watering treatment, and 1 mL of a solution (2.5 μmol/mL) of bisphenol metal complex 7 in toluene were added successively, followed by the addition of 8 mL (5 μmol/mL) of a boron-containing reagent, [Ph$_3$C][B(C$_6$F$_5$)$_4$]. With mechanical stirring, ethylene under a pressure of 0.5 MPa was introduced thereinto, and the reaction was allowed to continue at 80° C. under that pressure for 20 minutes, and then ethanol was added to terminate the reaction. 2.3 g of polyethylene polymer was obtained. The polymerization activity was calculated as 1.38×10$^6$ g·mol$^{-1}$(Ti)·h$^-$. The melting point measured by DSC was 134.1° C.; the Mw measured by GPC was 1.9×10$^5$, and the Mw/Mn was found to be 5.93.

Example 24

After having been dried by heating, a 500 mL polymerization autoclave was evacuated and then filled with nitrogen gas twice, following by evacuating and then filling with ethylene gas once. Then, 4 mL of 0.5 mmol/mL solution of triisobutylaluminum in n-hexane, 150 mL of n-hexane having subjected to de-oxygenation and de-watering treatment, and 2 mL of a solution (2.5 μmol/mL) of bisphenol metal complex 7 in toluene were added successively, followed by the addition of 4 mL (5 μmol/mL) of a boron-containing reagent, [Ph$_3$C][B(C$_6$F$_5$)$_4$]. With mechanical stirring, ethylene under a pressure of 0.5 MPa was introduced thereinto, and the reaction was allowed to continue at 80° C. under that pressure for 20 minutes, and then ethanol was added to terminate the reaction. 5.9 g of polyethylene polymer was obtained. The polymerization activity was calculated as 1.77×10$^6$ g·mol$^{-1}$(Ti)·h$^{-1}$. The melting point measured by DSC was 134.3° C.; the Mw measured by GPC was 2.0×10$^5$, and the Mw/Mn was found to be 7.94.

Example 25

After having been dried by heating, a 500 mL polymerization autoclave was evacuated and then filled with nitrogen gas twice, following by evacuating and then filling with ethylene gas once. Then, 2 mL of 0.5 mmol/mL solution of triisobutylaluminum in toluene, 150 mL of toluene having subjected to de-oxygenation and de-watering treatment, and 1 mL of a solution (2.5 μmol/mL) of bisphenol metal complex 7 in toluene were added successively, followed by the addition of 2 mL (5 μmol/mL) of a boron-containing reagent, [Ph$_3$C][B(C$_6$F$_5$)$_4$]. With mechanical stirring, ethylene under a pressure of 0.5 MPa was introduced thereinto, and the reaction was allowed to continue at 80° C. under that pressure for 40 minutes, and then ethanol was added to terminate the reaction. 6.3 g of polyethylene polymer was obtained. The polymerization activity was calculated as 1.89×10$^6$ g·mol$^{-1}$(Ti)·h$^{-1}$. The melting point measured by DSC was 131.0° C.; the Mw measured by GPC was 1.9×$^5$, and the Mw/Mn was found to be 5.54.

Example 26

After having been dried by heating, a 500 mL polymerization autoclave was evacuated and then filled with nitrogen gas twice, following by evacuating and then filling with ethylene gas once. Then, 2 mL of 0.5 mmol/mL solution of triisobutylaluminum in toluene, 150 mL of n-heptane having subjected to de-oxygenation and de-watering treatment, and 1 mL of a solution (2.5 μmol/mL) of bisphenol metal complex 7 in toluene were added successively, followed by the addition of 2 mL (5 μpmol/mL) of a boron-containing reagent, [Ph$_3$C][B(C$_6$F$_5$)$_4$]. With mechanical stirring, ethylene under a pressure of 0.5 MPa was introduced thereinto, and the reaction was allowed to continue at 80° C. under that pressure for 10 minutes, and then ethanol was added to terminate the reaction. 2.6 g of polyethylene polymer was obtained. The polymerization activity was calculated as 3.12×10$^6$ g·mol$^{-1}$(Ti)·h$^{-1}$. The melting point measured by DSC was 133.0° C.; the Mw measured by GPC was 1.6×10$^5$, and the Mw/Mn was found to be 4.99.

Example 27—Synthesis of a Copolymer of Ethylene and 1-hexene

After having been dried by heating, a 500 mL polymerization autoclave was evacuated and then filled with nitrogen gas twice, following by evacuating and then filling with ethylene gas once. Then, 6.8 ml of a solution (10% by mass) of methylaluminoxane (MAO) in toluene, 15 ml of 1-hexene, 150 mL of n-hexane having subjected to de-oxygenation and de-watering treatment, and 2 mL of a solution (2.5 pmol/mL) of bisphenol metal complex 7 in toluene were added successively. With mechanical stirring, ethylene under a pressure of 0.3 MPa was introduced thereinto, and the reaction was allowed to continue at 25° C. under that pressure for 20 minutes, and then ethanol was added to terminate the reaction. 5.21 g of a polymer was obtained. The activity was calculated as 1.56×10$^6$ g·mol$^{-1}$(Ti)·h$^{-1}$. The melting point measured by DSC was 103° C.; the Mw measured by GPC was 1.9×10$^5$, and the Mw/Mn was found to be 1.92. The molar content of 1-hexene was found via high temperature nuclear magnetic carbon spectrum to be 5.3%.

Example 28—Synthesis of a Copolymer of Ethylene and 1-hexene

After having been dried by heating, a 500 mL polymerization autoclave was evacuated and then filled with nitrogen gas twice, following by evacuating and then filling with ethylene gas once. Then, 3.4 ml of a solution (10% by mass) of methylaluminoxane (MAO) in toluene, 15 ml of 1-hexene, 150 mL of n-hexane having subjected to de-oxygenation and de-watering treatment, and 2 mL of a solution (2.5 μmol/mL) of bisphenol metal complex 7 in toluene were added successively. With mechanical stirring, ethylene under a pressure of 0.3 MPa was introduced thereinto, and the reaction was allowed to continue at 25° C. under that pressure for 20 minutes, and then ethanol was added to terminate the reaction. 4.97 g of a polymer was obtained. The activity was calculated as 1.49×10$^6$ g·mol$^{-1}$(Ti)·h$^{-1}$. The melting point measured by DSC was 107° C.; the Mw measured by GPC was 2.2×10$^5$, and the Mw/Mn was found to be 2.17. The molar content of 1-hexene was found via high temperature nuclear magnetic carbon spectrum to be 4.8%.

Example 29—Synthesis of a Copolymer of Ethylene and 1-hexene

After having been dried by heating, a 500 mL polymerization autoclave was evacuated and then filled with nitrogen gas twice, following by evacuating and then filling with ethylene gas once. Then, 13.6 ml of a solution (10% by mass) of methylaluminoxane (MAO) in toluene, 15 ml of 1-hexene, 150 mL of n-hexane having subjected to de-oxygenation and de-watering treatment, and 2 mL of a solution (2.5 μmol/mL) of bisphenol metal complex 7 in toluene were added successively. With mechanical stirring, ethylene under a pressure of 0.3 MPa was introduced thereinto, and the reaction was allowed to continue at 25° C. under that pressure for 20 minutes, and then ethanol was added to terminate the reaction. 5.07 g of a polymer was obtained. The activity was calculated as $1.52 \times 10^6$ g·mol$^{-1}$(Ti)·h$^{-1}$. The melting point measured by DSC was 104° C.; the Mw measured by GPC was $1.9 \times 10^5$, and the Mw/Mn was found to be 2.31. The content of 1-hexene was found via high temperature nuclear magnetic carbon spectrum to be 4.7%.

Example 30—Synthesis of a Copolymer of Ethylene and 1-hexene

After having been dried by heating, a 500 mL polymerization autoclave was evacuated and then filled with nitrogen gas twice, following by evacuating and then filling with ethylene gas once. Then, 6.8 ml of a solution (10% by mass) of methylaluminoxane (MAO) in toluene, 5 ml of 1-hexene, 150 mL of n-hexane having subjected to de-oxygenation and de-watering treatment, and 2 mL of a solution (2.5 pmol/mL) of bisphenol metal complex 7 in toluene were added successively. With mechanical stirring, ethylene under a pressure of 0.3 MPa was introduced thereinto, and the reaction was allowed to continue at 25° C. under that pressure for 20 minutes, and then ethanol was added to terminate the reaction. 7.43 g of a polymer was obtained. The activity was calculated as $2.23 \times 10^6$ g·mol$^{-1}$(Ti)·h$^{-1}$. The melting point measured by DSC was 123° C.; the Mw measured by GPC was $1.8 \times 10^5$, and the Mw/Mn was found to be 1.86. The content of 1-hexene was found via high temperature nuclear magnetic carbon spectrum to be 2.7%.

Example 31—Synthesis of a Copolymer of Ethylene and 1-hexene

After having been dried by heating, a 500 mL polymerization autoclave was evacuated and then filled with nitrogen gas twice, following by evacuating and then filling with ethylene gas once. Then, 6.8 ml of a solution (10% by mass) of methylaluminoxane (MAO) in toluene, 10 ml of 1-hexene, 150 mL of n-hexane having subjected to de-oxygenation and de-watering treatment, and 2 mL of a solution (2.5 μmol/mL) of bisphenol metal complex 7 in toluene were added successively. With mechanical stirring, ethylene under a pressure of 0.3 MPa was introduced thereinto, and the reaction was allowed to continue at 25° C. under that pressure for 20 minutes, and then ethanol was added to terminate the reaction. 8.87 g of a polymer was obtained. The activity was calculated as $2.66 \times 10^6$ g·mol$^{-1}$(Ti)·h$^{-1}$. The melting point measured by DSC was 116° C.; the Mw measured by GPC was $2.5 \times 10^5$, and the Mw/Mn was found to be 2.20. The content of 1-hexene was found via high temperature nuclear magnetic carbon spectrum to be 3.4%.

Example 32—Synthesis of a Copolymer of Ethylene and 1-hexene

After having been dried by heating, a 500 mL polymerization autoclave was evacuated and then filled with nitrogen gas twice, following by evacuating and then filling with ethylene gas once. Then, 6.8 ml of a solution (10% by mass) of methylaluminoxane (MAO) in toluene, 50 ml of 1-hexene, 150 mL of n-hexane having subjected to de-oxygenation and de-watering treatment, and 2 mL of a solution (2.5 μmol/mL) of bisphenol metal complex 7 in toluene were added successively. With mechanical stirring, ethylene under a pressure of 0.3 MPa was introduced thereinto, and the reaction was allowed to continue at 25° C. under that pressure for 20 minutes, and then ethanol was added to terminate the reaction. 6.77 g of a polymer was obtained. The activity was calculated as $2.03 \times 10^6$ g·mol$^{-1}$(Ti)·h$^{-1}$. The melting point measured by DSC was 70° C.; the Mw measured by GPC was $1.8 \times 10^5$, and the Mw/Mn was found to be 2.30. The molar content of 1-hexene was found via high temperature nuclear magnetic carbon spectrum to be 12.4%.

Example 33—Synthesis of a Copolymer of Ethylene and 1-hexene

After having been dried by heating, a 500 mL polymerization autoclave was evacuated and then filled with nitrogen gas twice, following by evacuating and then filling with ethylene gas once. Then, 6.8 ml of a solution (10% by mass) of methylaluminoxane (MAO) in toluene, 15 ml of 1-hexene, 300 mL of n-hexane having subjected to de-oxygenation and de-watering treatment, and 2 mL of a solution (2.5 μmol/mL) of bisphenol metal complex 7 in toluene were added successively. With mechanical stirring, ethylene under a pressure of 0.3 MPa was introduced thereinto, and the reaction was allowed to continue at 25° C. under that pressure for 20 minutes, and then ethanol was added to terminate the reaction. 13.6 g of a polymer was obtained. The activity was calculated as $4.08 \times 10^6$ g·mol$^{-1}$(Ti)·h$^{-1}$. The melting point measured by DSC was 119° C.; the Mw measured by GPC was $2.1 \times 10^5$, and the Mw/Mn was found to be 2.04. The content of 1-hexene was found via high temperature nuclear magnetic carbon spectrum to be 3.3%.

Example 34—Synthesis of a Copolymer of Ethylene and 1-hexene

After having been dried by heating, a 500 mL polymerization autoclave was evacuated and then filled with nitrogen gas twice, following by evacuating and then filling with ethylene gas once. Then, 6.8 ml of a solution (10% by mass) of methylaluminoxane (MAO) in toluene, 15 ml of 1-hexene, 150 mL of n-hexane having subjected to de-oxygenation and de-watering treatment, and 1 mL of a solution (2.5 μmol/mL) of bisphenol metal complex 7 in toluene were added successively. With mechanical stirring, ethylene under a pressure of 0.3 MPa was introduced thereinto, and the reaction was allowed to continue at 25° C. under that pressure for 20 minutes, and then ethanol was added to terminate the reaction. 2.14 g of a polymer was obtained. The activity was calculated as $1.28 \times 10^6$ g·mol$^{-1}$·h$^{-1}$. The melting point measured by DSC was 107° C.; the Mw measured by GPC was $1.9 \times 10^5$, and the Mw/Mn was found to be 1.91. The content of 1-hexene was found via high temperature nuclear magnetic carbon spectrum to be 4.9%.

Example 35—Synthesis of a Copolymer of Ethylene and 1-hexene

After having been dried by heating, a 500 mL polymerization autoclave was evacuated and then filled with nitrogen gas twice, following by evacuating and then filling with ethylene gas once. Then, 6.8 ml of a solution (10% by mass) of methylaluminoxane (MAO) in toluene, 15 ml of 1-hexene, 150 mL of n-hexane having subjected to de-oxygenation and de-watering treatment, and 4 mL of a solution (2.5 pmol/mL) of bisphenol metal complex 7 in toluene were added successively. With mechanical stirring, ethylene under a pressure of 0.3 MPa was introduced thereinto, and the reaction was allowed to continue at 25° C. under that pressure for 20 minutes, and then ethanol was added to terminate the reaction. 14.0 g of a polymer was obtained. The activity was calculated as $2.1 \times 10^6$ g·mol$^{-1}$·h$^{-1}$. The melting point measured by DSC was 93° C.; the Mw measured by GPC was $2.5 \times 10^5$, and the Mw/Mn was found to be 2.27. The content of 1-hexene was found via high temperature nuclear magnetic carbon spectrum to be 6.8%.

Example 36—Synthesis of a Copolymer of Ethylene and 1-hexene

After having been dried by heating, a 500 mL polymerization autoclave was evacuated and then filled with nitrogen gas twice, following by evacuating and then filling with ethylene gas once. Then, 6.8 ml of a solution (10% by mass) of methylaluminoxane (MAO) in toluene, 15 ml of 1-hexene, 150 mL of n-hexane having subjected to de-oxygenation and de-watering treatment, and 2 mL of a solution (2.5 μmol/mL) of bisphenol metal complex 7 in toluene were added successively. With mechanical stirring, ethylene under a pressure of 0.3 MPa was introduced thereinto, and the reaction was allowed to continue at 25° C. under that pressure for 10 minutes, and then ethanol was added to terminate the reaction. 2.67 g of a polymer was obtained. The activity was calculated as $1.60 \times 10^6$ g·mol$^{-1}$·h$^{-1}$. The melting point measured by DSC was 102° C.; the Mw measured by GPC was $1.7 \times 10^5$, and the Mw/Mn was found to be 1.85. The content of 1-hexene was found via high temperature nuclear magnetic carbon spectrum to be 5.0%.

Example 37—Synthesis of a Copolymer of Ethylene and 1-hexene

After having been dried by heating, a 500 mL polymerization autoclave was evacuated and then filled with nitrogen gas twice, following by evacuating and then filling with ethylene gas once. Then, 6.8 ml of a solution (10% by mass) of methylaluminoxane (MAO) in toluene, 15 ml of 1-hexene, 150 mL of n-hexane having subjected to de-oxygenation and de-watering treatment, and 2 mL of a solution (2.5 μmol/mL) of bisphenol metal complex 7 in toluene were added successively. With mechanical stirring, ethylene under a pressure of 0.3 MPa was introduced thereinto, and the reaction was allowed to continue at 25° C. under that pressure for 30 minutes, and then ethanol was added to terminate the reaction. 10.11 g of a polymer was obtained. The activity was calculated as $2.02 \times 10^6$ g·mol$^{-1}$·h$^{-1}$. The melting point measured by DSC was 108° C.; the Mw measured by GPC was $2.3 \times 10^5$, and the Mw/Mn was found to be 1.99. The content of 1-hexene was found via high temperature nuclear magnetic carbon spectrum to be 4.9%.

Example 38—Synthesis of a Copolymer of Ethylene and 1-hexene

After having been dried by heating, a 500 mL polymerization autoclave was evacuated and then filled with nitrogen gas twice, following by evacuating and then filling with ethylene gas once. Then, 6.8 ml of a solution (10% by mass) of methylaluminoxane (MAO) in toluene, 15 ml of 1-hexene, 150 mL of n-hexane having subjected to de-oxygenation and de-watering treatment, and 2 mL of a solution (2.5 pmol/mL) of bisphenol metal complex 7 in toluene were added successively. With mechanical stirring, ethylene under a pressure of 0.1 MPa was introduced thereinto, and the reaction was allowed to continue at 25° C. under that pressure for 20 minutes, and then ethanol was added to terminate the reaction. 1.81 g of a polymer was obtained. The activity was calculated as $5.4 \times 10^5$ g·mol$^{-1}$·h$^{-1}$. The melting point measured by DSC was 63° C.; the Mw measured by GPC was $2.1 > 10^5$, and the Mw/Mn was found to be 2.03. The content of 1-hexene was found via high temperature nuclear magnetic carbon spectrum to be 8.7%.

Example 39—Synthesis of a Copolymer of Ethylene and 1-hexene

After having been dried by heating, a 500 mL polymerization autoclave was evacuated and then filled with nitrogen gas twice, following by evacuating and then filling with ethylene gas once. Then, 6.8 ml of a solution (10% by mass) of methylaluminoxane (MAO) in toluene, 15 ml of 1-hexene, 150 mL of n-hexane having subjected to de-oxygenation and de-watering treatment, and 2 mL of a solution (2.5 pmol/mL) of bisphenol metal complex 7 in toluene were added successively. With mechanical stirring, ethylene under a pressure of 1.0 MPa was introduced thereinto, and the reaction was allowed to continue at 25° C. under that pressure for 20 minutes, and then ethanol was added to terminate the reaction. 10.48 g of a polymer was obtained. The activity was calculated as $3.14 \times 10^6$ g·mol$^{-1}$·h$^{-1}$. The melting point measured by DSC was 125° C.; the Mw measured by GPC was $2.3 \times 10^5$, and the Mw/Mn was found to be 2.42. The content of 1-hexene was found via high temperature nuclear magnetic carbon spectrum to be 2.8%.

Example 40—Synthesis of a Copolymer of Ethylene and 1-hexene

After having been dried by heating, a 500 mL polymerization autoclave was evacuated and then filled with nitrogen gas twice, following by evacuating and then filling with ethylene gas once. Then, 6.8 ml of a solution (10% by mass) of methylaluminoxane (MAO) in toluene, 100 ml of 1-hexene, 250 mL of n-hexane having subjected to de-oxygenation and de-watering treatment, and 2 mL of a solution (2.5 μmol/mL) of bisphenol metal complex 7 in toluene were added successively. With mechanical stirring, ethylene under a pressure of 3.0 MPa was introduced thereinto, and the reaction was allowed to continue at 25° C. under that pressure for 20 minutes, and then ethanol was added to terminate the reaction. 17.47 g of a polymer was obtained. The activity was calculated as $5.29 \times 10^6$ g·mol$^{-1}$h$^{-1}$. The melting point measured by DSC was 127° C.; the Mw measured by GPC was $2.5 \times 10^5$, and the Mw/Mn was found to be 2.18. The content of 1-hexene was found via high temperature nuclear magnetic carbon spectrum to be 1.8%.

Example 41—Synthesis of a Copolymer of Ethylene and 1-hexene

After having been dried by heating, a 500 mL polymerization autoclave was evacuated and then filled with nitrogen gas twice, following by evacuating and then filling with ethylene gas once. Then, 6.8 ml of a solution (10% by mass) of methylaluminoxane (MAO) in toluene, 15 ml of 1-hexene, 150 mL of n-hexane having subjected to de-oxygenation and de-watering treatment, and 2 mL of a solution (2.5 μmol/mL) of bisphenol metal complex 7 in toluene were added successively. With mechanical stirring, ethylene under a pressure of 0.3 MPa was introduced thereinto, and the reaction was allowed to continue at 40° C. under that pressure for 20 minutes, and then ethanol was added to terminate the reaction. 3.59 g of a polymer was obtained. The activity was calculated as $1.08 \times 10^6$ g·mol$^1$h$^{-1}$. The melting point measured by DSC was 89° C.; the Mw measured by GPC was $2.1 \times 10^5$, and the Mw/Mn was found to be 1.72. The content of 1-hexene was found via high temperature nuclear magnetic carbon spectrum to be 7.4%.

Example 42—Synthesis of a Copolymer of Ethylene and 1-hexene

After having been dried by heating, a 500 mL polymerization autoclave was evacuated and then filled with nitrogen gas twice, following by evacuating and then filling with ethylene gas once. Then, 6.8 ml of a solution (10% by mass) of methylaluminoxane (MAO) in toluene, 15 ml of 1-hexene, 150 mL of n-hexane having subjected to de-oxygenation and de-watering treatment, and 2 mL of a solution (2.5 pmol/mL) of bisphenol metal complex 7 in toluene were added successively. With mechanical stirring, ethylene under a pressure of 0.3 MPa was introduced thereinto, and the reaction was allowed to continue at 80° C. under that pressure for 20 minutes, and then ethanol was added to terminate the reaction. 2.66 g of a polymer was obtained. The activity was calculated as $7.98 \times 10^5$ g·mol$^{-1}$·h$^{-1}$. The melting point measured by DSC was 57° C.; the Mw measured by GPC was $1.8 \times 10^5$, and the Mw/Mn was found to be 2.41. The content of 1-hexene was found via high temperature nuclear magnetic carbon spectrum to be 12.1%.

Example 43—Synthesis of a Copolymer of Ethylene and 1-octene

After having been dried by heating, a 500 mL polymerization autoclave was evacuated and then filled with nitrogen gas twice, following by evacuating and then filling with ethylene gas once. Then, 6.8 ml of a solution (10% by mass) of methylaluminoxane (MAO) in toluene, 15 ml of 1-octene, 150 mL of n-hexane having subjected to de-oygenation and de-watering treatment, and 2 mL of a solution (2.5 pmol/mL) of bisphenol metal complex 7 in toluene were added successively. With mechanical stirring, ethylene under a pressure of 0.3 MPa was introduced thereinto, and the reaction was allowed to continue at 25° C. under that pressure for 20 minutes, and then ethanol was added to terminate the reaction. 5.84 g of a polymer was obtained. The activity was calculated as $1.75 \times 10^6$ g·mol$^{-1}$·h$^{-1}$. The melting point measured by DSC was 95° C.; the Mw measured by GPC was $1.9 \times 10^5$, and the Mw/Mn was found to be 2.07. The content of 1-octene was found via high temperature nuclear magnetic carbon spectrum to be 6.7%.

Example 44—Synthesis of a Copolymer of Ethylene and 1-decene

After having been dried by heating, a 500mL polymerization autoclave was evacuated and then filled with nitrogen gas twice, following by evacuating and then filling with ethylene gas once. Then, 6.8 ml of a solution (10% by mass) of methylaluminoxane (MAO) in toluene, 15 ml of 1-decene, 150 mL of n-hexane having subjected to de-oxygenation and de-watering treatment, and 2 mL of a solution (2.5 pmol/mL) of bisphenol metal complex 7 in toluene were added successively. With mechanical stirring, ethylene under a pressure of 0.3 MPa was introduced thereinto, and the reaction was allowed to continue at 25° C. under that pressure for 20 minutes, and then ethanol was added to terminate the reaction. 4.73 g of a polymer was obtained. The activity was calculated as $1.42 \times 10^6$ g·mol$^{-1}$·h$^{-1}$. The melting point measured by DSC was 102° C.; the Mw measured by GPC was $2.3 \times 10^5$, and the Mw/Mn was found to be 2.09. The content of 1-decene was found via high temperature nuclear magnetic carbon spectrum to be 5.5%.

Example 45

After having been dried by heating, a 500 mL polymerization autoclave was evacuated and then filled with nitrogen gas twice, following by evacuating and then filling with ethylene gas once. Then, 2 mL of 0.5 mmol/mL solution of triisobutylaluminum in n-hexane, 87 mL of n-hexane having subjected to de-oxygenation and de-watering treatment, 8 mL of 1-octene, and 1 mL of a solution (2.5 μmol/mL) of bisphenol metal complex 7 in toluene were added successively, followed by the addition of 2 mL of a solution (5 μmol/mL) of a boron-containing reagent, [Ph$_3$C][B(C$_6$F$_5$)$_4$] in toluene. With mechanical stirring, ethylene under a pressure of 0.5 MPa was introduced thereinto, and the reaction was allowed to continue at 80° C. under that pressure for 20 minutes, and then ethanol was added to terminate the reaction. 9.6 g of a polymer was obtained. The polymerization activity was calculated as $5.76 \times 10^6$ g·mol$^{-1}$ (Ti)·h$^{-1}$. The melting point of the polymer measured by DSC was 94° C.; the Mw of the polymer measured by GPC was $1.16 \times 10^5$, and the Mw/Mn was found to be 4.08. The content of 1-octene was found via high temperature nuclear magnetic carbon spectrum to be 8.9%.

Example 46

After having been dried by heating, a 500mL polymerization autoclave was evacuated and then filled with nitrogen gas twice, following by evacuating and then filling with ethylene gas once. Then, 2 mL of 0.5 mmol/mL solution of triisobutylaluminum in n-hexane, 87 mL of n-hexane having subjected to de-oxygenation and de-watering treatment, 8 mL of 1-octene, and 1 mL of a solution (2.5 μmol/mL) of bisphenol metal complex 7 in toluene were added successively, followed by the addition of 2 mL of a solution (5 μmol/mL) of a boron-containing reagent, [Ph$_3$C][B(C$_6$F$_5$)$_4$], in toluene. With mechanical stirring, ethylene under a pressure of 0.1 MPa was introduced thereinto, and the reaction was allowed to continue at 0° C. under that pressure for 20 minutes, and then ethanol was added to terminate the reaction. 3.9 g of a polymer was obtained. The polymerization activity was calculated as $2.34 \times 10^6$ g mol$^{-1}$ (Ti)·h$^{-1}$. The melting point of the polymer could not be measured by DSC; the Mw of the polymer measured by GPC was $7.3 \times 10^4$, and the Mw/Mn was found to be 3.87. The content of 1-octene was found via high temperature nuclear magnetic carbon spectrum to be 19.4%.

Example 47

After having been dried by heating, a 500 mL polymerization autoclave was evacuated and then filled with nitrogen gas twice, following by evacuating and then filling with ethylene gas once. Then, 2 mL of 0.5 mmol/mL solution of triisobutylaluminum in n-hexane, 87 mL of n-hexane having subjected to de-oxygenation and de-watering treatment, 8 mL of 1-octene, and 1 mL of a solution (2.5 μmol/mL) of bisphenol metal complex 7 in toluene were added successively, followed by the addition of 2 mL of a solution (5 μmol/mL) of a boron-containing reagent, [Ph$_3$C][B(C$_6$F$_5$)$_4$], in toluene. With mechanical stirring, ethylene under a pressure of 2.0 MPa was introduced thereinto, and the reaction was allowed to continue at 40° C. under that pressure for 20 minutes, and then ethanol was added to terminate the reaction. 18.0 g of a polymer was obtained. The polymerization activity was calculated as $1.08 \times 10^7$ g·mol$^-$(Ti)·h$^{-1}$. The melting point of the polymer measured by DSC was 113° C.; the Mw of the polymer measured by GPC was $1.51 \times 10^5$, and the Mw/Mn was found to be 3.47. The content of 1-octene was found via high temperature nuclear magnetic carbon spectrum to be 3.3%.

Example 48

After having been dried by heating, a 500 mL polymerization autoclave was evacuated and then filled with nitrogen gas twice, following by evacuating and then filling with ethylene gas once. Then, 2 mL of 0.5 mmol/mL solution of triisobutylaluminum in n-hexane, 79 mL of n-hexane having subjected to de-oxygenation and de-watering treatment, 16 mL of 1-octene, and 1 mL of a solution (2.5 µmol/mL) of bisphenol metal complex 7 in toluene were added successively, followed by the addition of 2 mL of a solution (5 pmol/mL) of a boron-containing reagent, [Ph$_3$C][B(C$_6$F$_5$)$_4$], in toluene. With mechanical stirring, ethylene under a pressure of 0.5 MPa was introduced thereinto, and the reaction was allowed to continue at 80° C. under that pressure for 20 minutes, and then ethanol was added to terminate the reaction. 12.3 g of a polymer was obtained. The polymerization activity was calculated as $7.38 \times 10^6$ g·mol$^{-1}$(Ti)·h$^{-1}$. The melting point of the polymer measured by DSC was 56° C.; the Mw of the polymer measured by GPC was $1.0 \times 10^5$, and the Mw/Mn was found to be 2.58. The content of 1-octene was found via high temperature nuclear magnetic carbon spectrum to be 13.8%.

Example 49

After having been dried by heating, a 500 mL polymerization autoclave was evacuated and then filled with nitrogen gas twice, following by evacuating and then filling with ethylene gas once. Then, 2 mL of 0.5 mmol/mL solution of triisobutylaluminum in n-hexane, 81 mL of n-hexane having subjected to de-oxygenation and de-watering treatment, 14 mL of 1-hexene, and 1 mL of a solution (2.5 µmol/mL) of bisphenol metal complex 7 in toluene were added successively, followed by the addition of 2 mL of a solution (5 µmol/mL) of a boron-containing reagent, [Ph$_3$C][B(C$_6$F$_5$)$_4$], in toluene. With mechanical stirring, ethylene under a pressure of 0.5 MPa was introduced thereinto, and the reaction was allowed to continue at 80° C. under that pressure for 20 minutes, and then ethanol was added to terminate the reaction. 8.8 g of a polymer was obtained. The polymerization activity was calculated as $5.28 \times 10^6$ g·mol$^{-1}$ (Ti)·h$^{-1}$. The melting point of the polymer could not be measured by DSC; the Mw of the polymer measured by GPC was $9.7 \times 10^4$, and the Mw/Mn was found to be 2.44. The content of 1-hexene was found via high temperature nuclear magnetic carbon spectrum to be 14.8%.

Example 50

After having been dried by heating, a 500 mL polymerization autoclave was evacuated and then filled with nitrogen gas twice, following by evacuating and then filling with ethylene gas once. Then, 2 mL of 0.5 mmol/mL solution of triisobutylaluminum in n-hexane, 81 mL of n-hexane having subjected to de-oxygenation and de-watering treatment, 3.73 g of 1-butene, and 1 mL of a solution (2.5 µmol/mL) of bisphenol metal complex 7 in toluene were added successively, followed by the addition of 2 mL of a solution (5 µmol/mL) of a boron-containing reagent, [Ph$_3$C][B(C$_6$F$_5$)$_4$], in toluene. With mechanical stirring, ethylene under a pressure of 0.5 MPa was introduced thereinto, and the reaction was allowed to continue at 80° C. under that pressure for 20 minutes, and then ethanol was added to terminate the reaction. 8.4 g of a polymer was obtained. The polymerization activity was calculated as $5.04 \times^6$ g mol$^{-1}$ (Ti)·h$^{-1}$. The melting point of the polymer measured by DSC was 123° C.; the Mw of the polymer measured by GPC was $1.7 \times 10^5$, and the Mw/Mn was found to be 2.34. The content of 1-butene was found via high temperature nuclear magnetic carbon spectrum to be 4.6%.

Example 51

After having been dried by heating, a 500 mL polymerization autoclave was evacuated and then filled with nitrogen gas twice, following by evacuating and then filling with ethylene gas once. Then, 2 mL of 0.5 mmol/mL solution of triethylaluminum in n-hexane, 81 mL of n-hexane having subjected to de-oxygenation and de-watering treatment, 16 mL of 1-octene, and 1 mL of a solution (2.5 µmol/mL) of bisphenol metal complex 7 in toluene were added successively, followed by the addition of 2 mL of a solution (5 µmol/mL) of a boron-containing reagent, [Ph$_3$C][B(C$_6$F$_5$)$_4$], in toluene. With mechanical stirring, ethylene under a pressure of 0.5 MPa was introduced thereinto, and the reaction was allowed to continue at 80° C. under that pressure for 20 minutes, and then ethanol was added to terminate the reaction. 11.2 g of a polymer was obtained. The polymerization activity was calculated as $6.72 \times 10^6$ g·mol$^{-1}$(Ti)·h$^{-1}$. The melting point of the polymer measured by DSC was 53° C.; the Mw of the polymer measured by GPC was $8.1 \times 10^4$, and the Mw/Mn was found to be 2.63. The content of 1-octene was found via high temperature nuclear magnetic carbon spectrum to be 15.3%.

Example 52

After having been dried by heating, a 500 mL polymerization autoclave was evacuated and then filled with nitrogen gas twice, following by evacuating and then filling with ethylene gas once. Then, 2 mL of 0.5 mmol/mL solution of triisobutylaluminum in toluene, 87 mL of toluene having subjected to de-oxygenation and de-watering treatment, 8 mL of 1-octene, and 1 mL of a solution (2.5 µmol/mL) of bisphenol metal complex 7 in toluene were added successively, followed by the addition of 2 mL of a solution (5 µmol/mL) of a boron-containing reagent, [PhNMe$_2$][B(C$_6$R$_5$)$_4$], in toluene. With mechanical stirring, ethylene under a pressure of 0.5 MPa was introduced thereinto, and the reaction was allowed to continue at 80° C. under that pressure for 20 minutes, and then ethanol was added to terminate the reaction. 9.9 g of a polymer was obtained. The polymerization activity was calculated as $5.94 \times 10^6$ g·mol$^-$(Ti)·h$^{-1}$. The melting point of the polymer measured by DSC was 91° C.; the Mw of the polymer measured by GPC was $1.6 \times 10^5$, and the Mw/Mn was found to be 2.23. The content of 1-octene was found via high temperature nuclear magnetic carbon spectrum to be 9.3%.

Example 53

After having been dried by heating, a 500 mL polymerization autoclave was evacuated and then filled with nitrogen gas twice, following by evacuating and then filling with ethylene gas once. Then, 2 mL of 0.5 mmol/mL solution of triisobutylaluminum in n-hexane, 87 mL of toluene having subjected to de-oxygenation and de-watering treatment, 8 mL of 1-octene, and 1 mL of a solution (2.5 μmol/mL) of bisphenol metal complex 7 in toluene were added successively, followed by the addition of 2 mL of a solution (5 pmol/mL) of a boron-containing reagent, [PhNMe$_2$][B(C$_6$R$_5$)$_4$], in toluene. With mechanical stirring, ethylene under a pressure of 0.5 MPa was introduced thereinto, and the reaction was allowed to continue at 80° C. under that pressure for 10 minutes, and then ethanol was added to terminate the reaction. 5.8 g of a polymer was obtained. The polymerization activity was calculated as $6.96 \times 10^6$ g·mol$^{-1}$ (Ti)·h$^{-1}$. The melting point of the polymer measured by DSC was 91° C.; the Mw of the polymer measured by GPC was $1.4 \times 10^5$, and the Mw/Mn was found to be 2.03. The content of 1-octene was found via high temperature nuclear magnetic carbon spectrum to be 9.7%.

Example 54

After having been dried by heating, a 500 mL polymerization autoclave was evacuated and then filled with nitrogen gas twice, following by evacuating and then filling with ethylene gas once. Then, 2 mL of 0.5 mmol/mL solution of triisobutylaluminum in n-hexane, 87 mL of n-hexane having subjected to de-oxygenation and de-watering treatment, 8 mL of 1-octene, and 1 mL of a solution (2.5 μmol/mL) of bisphenol metal complex 7 in toluene were added successively, followed by the addition of 2 mL of a solution (5 pmol/mL) of a boron-containing reagent, [PhNMe$_2$][B(C$_6$R$_5$)$_4$], in toluene. With mechanical stirring, ethylene under a pressure of 0.5 MPa was introduced thereinto, and the reaction was allowed to continue at 80° C. under that pressure for 40 minutes, and then ethanol was added to terminate the reaction. 15.7 g of a polymer was obtained. The polymerization activity was calculated as $4.71 \times 10^6$ g·mol$^{-1}$(Ti)·h$^{-1}$. The melting point of the polymer measured by DSC was 95° C.; the Mw of the polymer measured by GPC was $1.7 \times 10^5$, and the Mw/Mn was found to be 2.33. The content of 1-octene was found via high temperature nuclear magnetic carbon spectrum to be 8.5%.

Example 55

After having been dried by heating, a 500 mL polymerization autoclave was evacuated and then filled with nitrogen gas twice, following by evacuating and then filling with ethylene gas once. Then, 2 mL of a 0.5 mmol/mL solution of triisobutylaluminum in n-hexane, 150 mL of n-hexane having subjected to de-oxygenation and de-watering treatment, and 2 mL of a 2.5 pmol/mL solution of bisphenol metal complex A in toluene were added successively, followed by the addition of 3 mL (5 μmol/mL) of a boron-containing reagent, [Ph3C][B(C$_6$F$_5$)$_4$]. With mechanical stirring, ethylene under a pressure of 0.4 MPa was introduced thereinto, and the reaction was allowed to continue at 40° C. under that pressure for 10 minutes, and then ethanol was added to terminate the reaction. 1.3 g of a polyethylene polymer was obtained. The polymerization activity was calculated as $7.8 \times 10^5$ g·mol$^{-1}$ (Ti)·h$^{-1}$. The melting point measured by DSC was 130.0° C.; the Mw of the polyethylene measured by GPC was $3.4 \times 10^5$, and the Mw/Mn was found to be 8.53.

Example 56

After having been dried by heating, a 500 mL polymerization autoclave was evacuated and then filled with nitrogen gas twice, following by evacuating and then filling with ethylene gas once. Then, 2 mL of a 0.5 mmol/mL solution of triisobutylaluminum in n-hexane, 9.3 mL of 1-octene, 150 mL of n-hexane having subjected to de-oxygenation and de-watering treatment, and 2 mL of a 2.5 μmol/mL solution of bisphenol metal complex A in toluene were added successively, followed by the addition of 3 mL (5 μmol/mL) of a boron-containing reagent, [Ph3C][B(C$_6$F$_5$)$_4$]. With mechanical stirring, ethylene under a pressure of 0.4 MPa was introduced thereinto, and the reaction was allowed to continue at 40° C. under that pressure for 10 minutes, and then ethanol was added to terminate the reaction. 2.25 g of a polyethylene polymer was obtained. The activity was calculated as $1.35 \times 10^6$ g·mol$^{-1}$ (Ti)·h$^{-1}$. The melting point measured by DSC was 125.5° C.; the Mw of the polyethylene measured by GPC was $5.6 \times 10^4$, and the Mw/Mn was found to be 2.91. The molar content of 1-octene was found via high temperature nuclear magnetic carbon spectrum to be 2.4%.

For any numerical value mentioned in the present invention, if there is only a two-unit interval between any lowest value and any highest value, then all values with one-unit increment from the lowest value to the highest value are included. For example, if the amount of a component, or the value of process variables such as temperature, pressure, time, etc., is stated to be 50-90, then in this specification it means that values such as 51-89, 52-88 . . . 69-71 and 70-71 are specifically enumerated. For non-integer values, 0.1, 0.01, 0.001, or 0.0001 can be suitably considered as one unit. These are just examples specifically mentioned. In this application, in a similar manner, all possible combinations of numerical values between the lowest value and the highest value listed are considered as having been disclosed.

It should be noted that the above-described examples are only used to explain the present invention and do not constitute any limitation to the present invention. The present invention has been described with reference to typical examples, but it should be understood that the words used therein are descriptive and explanatory words, rather than restrictive words. The present invention may be modified within the scope of the claims of the present invention as stipulated, and the present invention may be revised without departing from the scope and spirit of the present invention. Although the present invention described therein relates to specific methods, materials and embodiments, it does not mean that the present invention is limited to the specific examples disclosed therein. On the contrary, the present invention can be extended to all other methods and applications with the same function.

We claim:
1. A catalyst composition for olefin polymerization, comprising a main catalyst and a cocatalyst, wherein the main catalyst comprises a bisphenol metal complex represented by Formula Ia:

Formula Ia

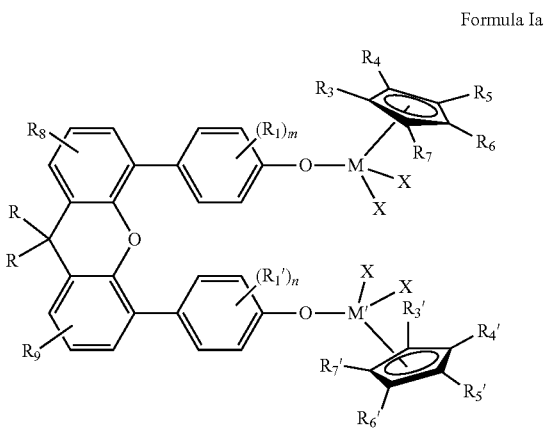

wherein $R_1$ and $R_1'$ are each independently selected from hydrogen and substituted or unsubstituted $C_1$-$C_{20}$) hydrocarbyl;

$R_3$-$R_7$ and $R_3'$-$R_7'$ are each independently selected from hydrogen and substituted or unsubstituted $C_1$-$C_{20}$ hydrocarbyl, and any two adjacent groups of $R_3$-$R_7$ are optionally joined to form a ring, and any two adjacent groups of $R_3'$-$R_7'$ are optionally joined to form a ring;

$R_8$ and $R_9$ are each independently selected from hydrogen and substituted or unsubstituted $C_1$-$C_{20}$ hydrocarbyl;

each R is independently selected from hydrogen and substituted or unsubstituted $C_1$-$C_{20}$ hydrocarbyl;

M and M' are each independently a Group 4 metal;

each X is independently selected from hydrocarbyl having 1 to 20 carbon atoms, hydride, amido, alkoxide, alkyl sulfide, alkyl phophide, halide, diene, amine, phosphine, and ether; and m and n are independently an integer selected from 1, 2, 3, and 4; and wherein the cocatalyst comnprises an organoaluminum compound.

2. The catalyst composition for olefin polymerization according to claim 1, wherein the bisphenol metal complex has a structure represented by Formula Ib:

Formula Ib

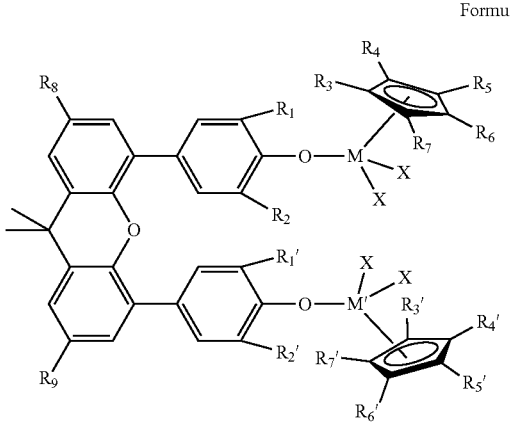

wherein, $R_1$, $R_1'$, $R_2$, and $R_2'$ are each independently selected from hydrogen and substituted or unsubstituted $C_1$-$C_{20}$ hydrocarbyl;

$R_3$-$R_7$ and $R_3'$-$R_7'$ are each independently selected from hydrogen and substituted or unsubstituted $C_1$-$C_{20}$ hydrocarbyl, and any two adjacent groups of $R_3$-$R_7$ are optionally joined to form a ring, and any two adjacent groups of $R_3'$-$R_7'$ are optionally joined to form a ring;

$R_8$ and $R_9$ are each independently selected from hydrogen and substituted or unsubstituted $C_1$-$C_{20}$ hydrocarbyl;

M and M' are each independently a Group 4 metal;

each X is independently selected from hydrocarbyl having 1 to 20 carbon atoms, hydride, amido, alkoxide, alkyl sulfide, alkyl phophide, halide, diene, amine, phosphine, and ether.

3. The catalyst according to claim 1, wherein the bisphenol metal complex is at least one represented by Formula Ib:

Formula Ib

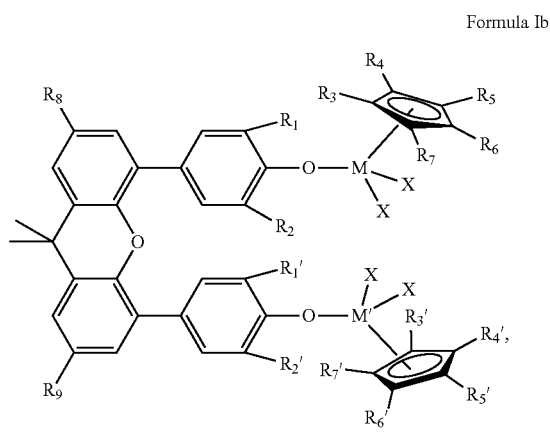

selected from:

bisphenol metal complex 1: wherein $R_1$, $R_2$, $R_1'$ $R_2'$ are methyl, $R_3$, $R_4$, $R_5$, $R_6$, $R_7$, $R_3'$, $R_4'$, $R_5'$, $R_6'$, $R_7'$, $R_8$ and $R_9$ are H, M and M'are =Ti, X is Cl or methyl;

bisphenol metal complex 2: wherein $R_1$, $R_2$, $R_1'$ and $R_2'$ are ethyl, $R_3$, $R_4$, $R_5$, $R_6$, $R_7$, $R_3'$, $R_4'$, $R_5'$, $R_6'$, $R_7'$, $R_8$ and $R_9$ are H, M and M'Ti, X is Cl or methyl;

bisphenol metal complex 3: wherein $R_1$, $R_2$, $R_1'$ and $R_2'$ are isopropyl, $R_3$, $R_4$, $R_5$, $R_6$, $R_7$, $R_3'$, $R_4'$, $R_5'$, $R_6'$, $R_7'$, $R_8$ and $R_9$ are H, M and M'are Ti, X is Cl or methyl;

bisphenol metal complex 4: wherein $R_1$, $R_2$, $R_1'$ and $R_2'$ are tert-butyl, $R_3$, $R_4$, $R_5$, $R_6$, $R_7$, $R_3'$, $R_4'$, $R_5'$, $R_6'$, $R_7'$, $R_8$ and $R_9$ are H, M M' are Ti, X is Cl or methyl;

bisphenol metal complex 5: wherein $R_1$, $R_2$, $R_1'$ and $R_2'$ are methyl, $R_3$, $R_4$, $R_5$, $R_6$, $R_7$, $R_3'$, $R_4'$, $R_5'$, $R_6'$, and $R_7'$ are methyl, $R_8$ and $R_9$ are H, M and M'are Ti, X is Cl or methyl;

bisphenol metal complex 6: wherein $R_1$, $R_2$, $R_1'$ and $R_2'$ are ethyl, $R_3$, $R_4$, $R_5$, $R_6$, $R_7$, $R_3'$, $R_4'$, $R_5'$, $R_6'$ and $R_7$ are methyl, $R_8$ and $R_9$ are H, M and M'Ti, X is Cl or methyl;

bisphenol metal complex 7: wherein $R_1$, $R_2$, $R_1'$ and $R_2'$ are tert-butyl, $R_3$, $R_4$, $R_5$, $R_6$, $R_7$, $R_3'$, $R_4'$, $R_5'$, $R_6'$ and $R_7'$ are methyl, $R_8$ and $R_9$ are H, M M' are Ti, X is Cl or methyl; and bisphenol metal complex 8: wherein $R_1$, $R_2$, $R_1'$ and $R_2'$ are tert-butyl, $R_3$, $R_4$, $R_5$, $R_6$, $R_7$, $R_3'$, $R_4'$, $R_5'$, $R_6'$ and $R_7'$ are methyl, $R_8$ and $R_9$ are H, M M' are Ti, X is Cl or methyl.

4. The catalyst composition according to claim 1, wherein the organoaluminum compound includes an aluminoxane having the following general formula:

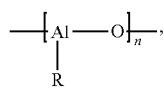

Formula VI wherein, R is a $C_1$-$C_{12}$ hydrocarbyl.

5. The catalyst composition according to claim 4, wherein a molar ratio of the main catalyst to the cocatalyst (in terms of metal for the main catalyst and in terms of aluminum for the cocatalyst) is 1:(200-5000).

6. The catalyst composition according to claim 1, wherein the cocatalyst comprises a combination of an organoaluminum compound and an organoboron compound, the organoaluminum compound is selected from aluminum alkyls and alkyl aluminum halides, or the organoaluminum compound is selected from aluminoxanes and modified aluminoxanes, the organoboron compound is selected from aromatic hydrocarbyl borons and borates.

7. The catalyst composition as according to claim 6, wherein a molar ratio of the main catalyst (in terms of the metal in the catalyst compound) to the organoboron compound (in terms of boron) to the organoaluminum compound (in terms of aluminum) is 1:(1-10):(100-2000).

8. The catalyst composition according to claim 1, wherein the main catalyst comprises the bisphenol metal complex represented by Formula Ia and a support material.

9. An ethylene homopolymerization process, comprising polymerizing ethylene monomer in the presence of the catalyst composition according to claims 1.

10. The ethylene homopolymerization process according to claim 9, wherein the polymerization
1) is performed in the presence of the catalyst composition comprising a main catalyst and a cocatalyst, the cocatalyst comprising an organoaluminum compound and an organoboron compound,
wherein the organoaluminum compound is selected from aluminum alkyls, alkyl aluminum halides and alkylaluminoxanes,
wherein the organoboron compound is selected from aromatic hydrocarbyl boron compounds and borates,
and wherein a molar ratio of the main catalyst in terms of the metal in the catalyst compound to the organoboron compound in terms of boron to the organoaluminum compound in terms of aluminum is 1:(1-10):(100-2000); or
2) is performed in the presence of the catalyst composition comprising a main catalyst and a cocatalyst, wherein the cocatalyst comprises an aluminoxane,
wherein a molar ratio of the main catalyst (in terms of the metal in the catalyst compound) to the aluminoxane (in terms of aluminum) is 1:(200-5000),
and the aluminoxane has a general formula:

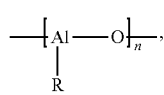

Formula VI wherein, R is a $C_1$-$C_{12}$ hydrocarbyl.

11. The ethylene homopolymerization process according to claim 9, wherein the polymerization
1) is performed at a temperature of −30 to 150° C.;
2) is performed under a pressure of 0.1 to 10 MPa;
3) is performed for a period of time of 10 to 60 minutes; and/or
4) is performed in an inert solvent.

12. An ethylene copolymerization process, where ethylene and a comonomer are polymerized in the presence of the catalyst composition according to claim 1.

13. The ethylene copolymerization process according to claim 12, wherein the polymerization
1) is performed in the presence of the catalyst composition comprising a main catalyst and a cocatalyst, the cocatalyst comprising an organoaluminum compound and an organoboron compound,
wherein the organoaluminum compound is selected from aluminum alkyls, alkyl aluminum halides and alkylaluminoxane,
wherein the organoboron compound is selected from aromatic hydrocarbyl boron compounds and borates,
and wherein, a molar ratio of the main catalyst to the organoboron compound to the organoaluminum compound is 1:(1-10):(100-2000); alternatively a molar ratio of the main catalyst to the organoboron compound to the organoaluminum compound is 1:(1-20):(200-2000); or
2) is performed in the presence of the catalyst composition comprising a main catalyst and a cocatalyst, the cocatalyst comprising an aluminoxane,
wherein a molar ratio of the main catalyst to the aluminoxane is 1:(200-5000),
wherein the aluminoxane has a general formula:

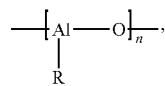

Formula VI wherein, R is a $C_1$-$C_{12}$ hydrocarbyl.

14. The ethylene copolymerization process according to claim 12, wherein the polymerization
1) utilizes the comonomer including an α-olefin and/or a diene;
2) is performed at a temperature of −30 to 150° C.;
3) is performed under a pressure of 0.1 to 10 MPa;
4) is performed for a period of time of 10 to 60 minutes; and/or
5) is performed in an inert solvent.

15. The catalyst composition according to claim 1, wherein in Formula Ia:
$R_1$ and $R_1'$ are each independently selected from hydrogen, substituted or unsubstituted, linear or branched $C_1$-$C_{20}$ alkyl and substituted or unsubstituted $C_6$-$C_{20}$ aryl;
$R_3$-$R_7$ and $R_3$-$R_7'$ are each independently selected from hydrogen and substituted or unsubstituted, linear or branched $C_1$-$C_{20}$ alkyl;
$R_8$ and $R_9$ are each independently selected from hydrogen and substituted or unsubstituted, linear or branched $C_1$-$C_{20}$ alkyl;
M and M' are each independently selected from titanium, zirconium and hafnium; and
each X is independently selected from methyl, fluoride, chloride, bromide and iodide.

16. The catalyst composition according to claim 2, wherein in Formula Ib,
- $R_1$, $R_1'$, $R_2$ and $R_2'$ are each independently selected from hydrogen, substituted or unsubstituted, linear or branched $C_1$-$C_{20}$ alkyl and substituted or unsubstituted $C_6$-$C_{20}$ aryl;
- $R_3$-$R_7$ and $R_3'$-$R_7'$ are each independently selected from hydrogen and substituted or unsubstituted, linear or branched $C_1$-$C_{20}$ alkyl;
- $R_8$ and $R_9$ are each independently selected from hydrogen and substituted or unsubstituted, linear or branched $C_1$-$C_{20}$ alkyl;
- M and M' are each independently selected from titanium, zirconium and hafnium; and
- each X is independently selected from methyl, fluoride, chloride, bromide and iodide.

\* \* \* \* \*